United States Patent [19]
Pascucci et al.

[11] 4,060,735
[45] Nov. 29, 1977

[54] CONTROL SYSTEM EMPLOYING A PROGRAMMABLE MULTIPLE CHANNEL CONTROLLER FOR TRANSMITTING CONTROL SIGNALS OVER ELECTRICAL POWER LINES

[75] Inventors: Gregory A. Pascucci, Milwaukee; Ramesh Krishnaiyer, Hales Corners; Donald Floyd Pridemore, Milwaukee, all of Wis.

[73] Assignee: Johnson Controls, Inc., Milwaukee, Wis.

[21] Appl. No.: 704,536

[22] Filed: July 12, 1976

[51] Int. Cl.² .............................................. H02J 3/02
[52] U.S. Cl. ................................... 307/3; 340/310 A
[58] Field of Search ....................... 307/3, 140, 85, 86, 307/87, 4, 5; 340/310 R, 310 A, 310 CP

[56] References Cited
U.S. PATENT DOCUMENTS

| 2,745,991 | 5/1956 | Seymour | 340/310 A |
| 3,689,886 | 9/1972 | Durkee | 340/310 A |

Primary Examiner—Robert K. Schaefer
Assistant Examiner—Morris Ginsburg
Attorney, Agent, or Firm—Emrich, Root, O'Keeffe & Lee

[57] ABSTRACT

A control system including a programmable multiple channel digital controller which is operable to generate control signals which are transmitted over electrical power lines of a building complex for enabling receivers associated with functional devices for controlling the operation of functional devices, the transmitter being operable to transmit control signals during selected ones of a plurality of data channels which define a data frame, and in one embodiment, different ones of the receivers are programmed to respond to control signals transmitted in different data channels for controlling the associated functional device. In another embodiment, the transmitted control signals are coded to represent an address of one or more of the receivers and a control command, each receiver comparing its address with the transmitted address, and the addressed receiver effecting the control function represented by the control command.

40 Claims, 9 Drawing Figures

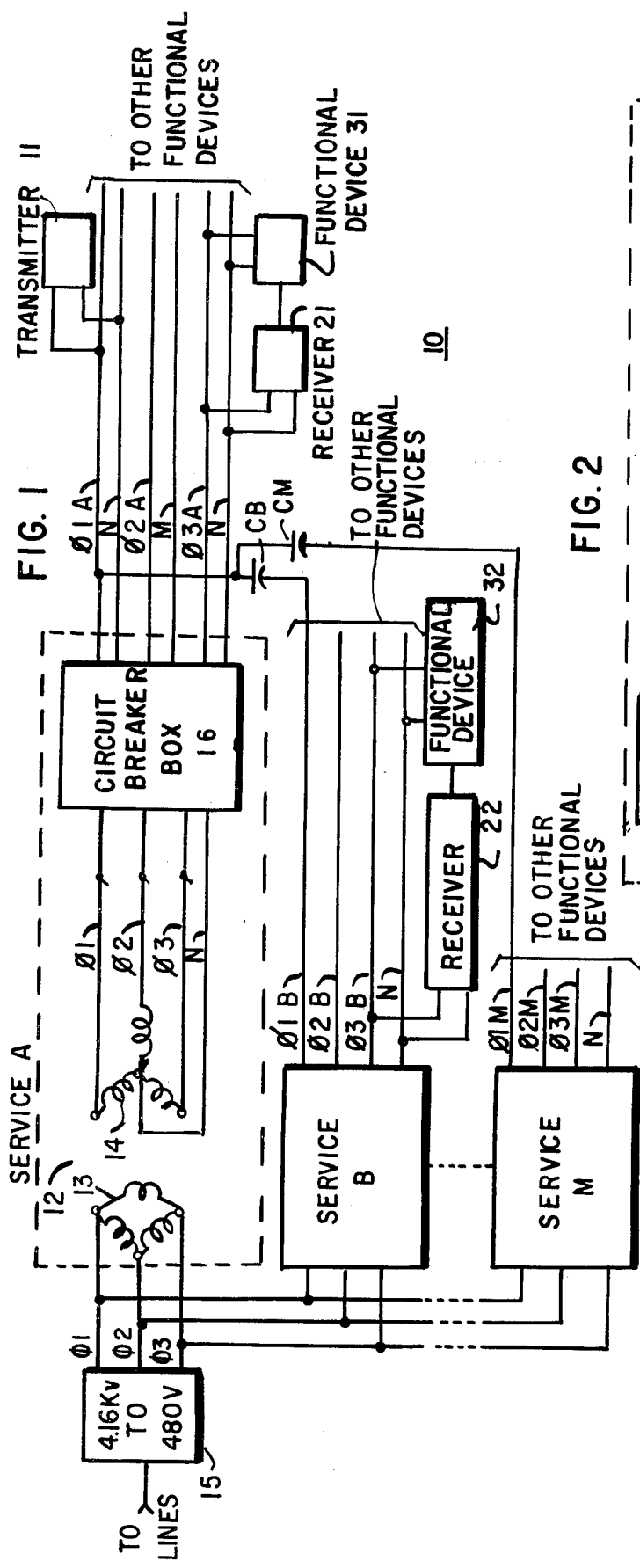

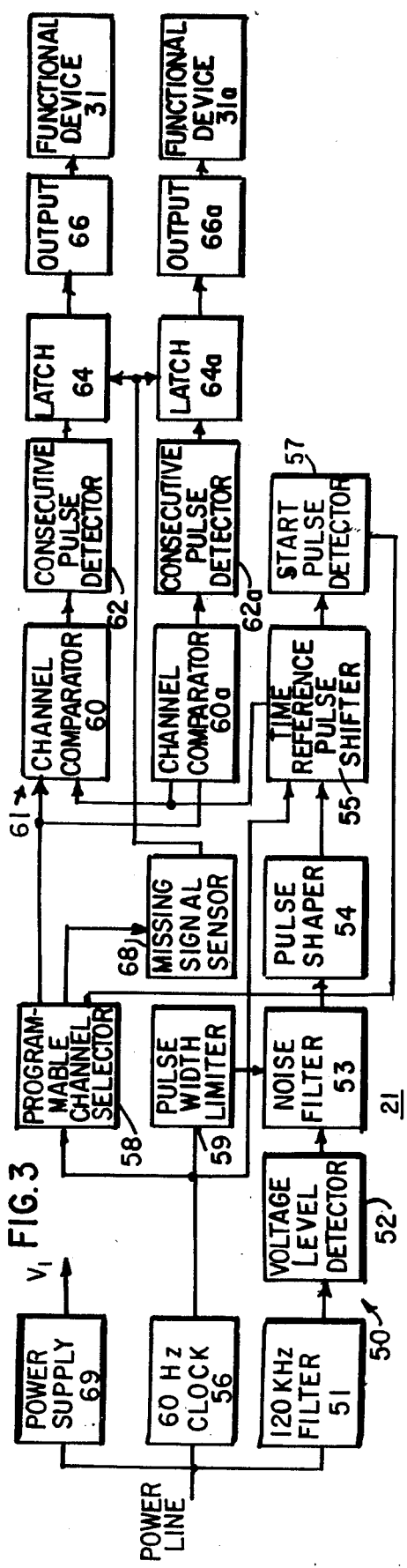
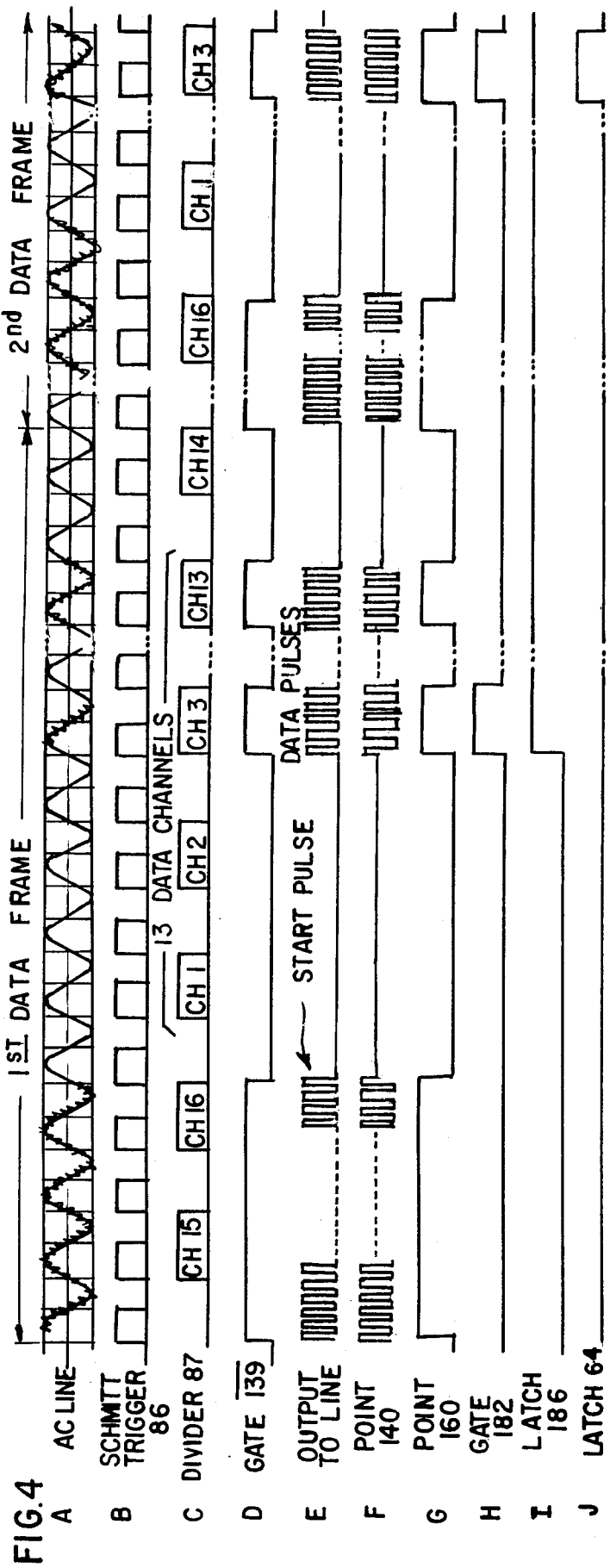

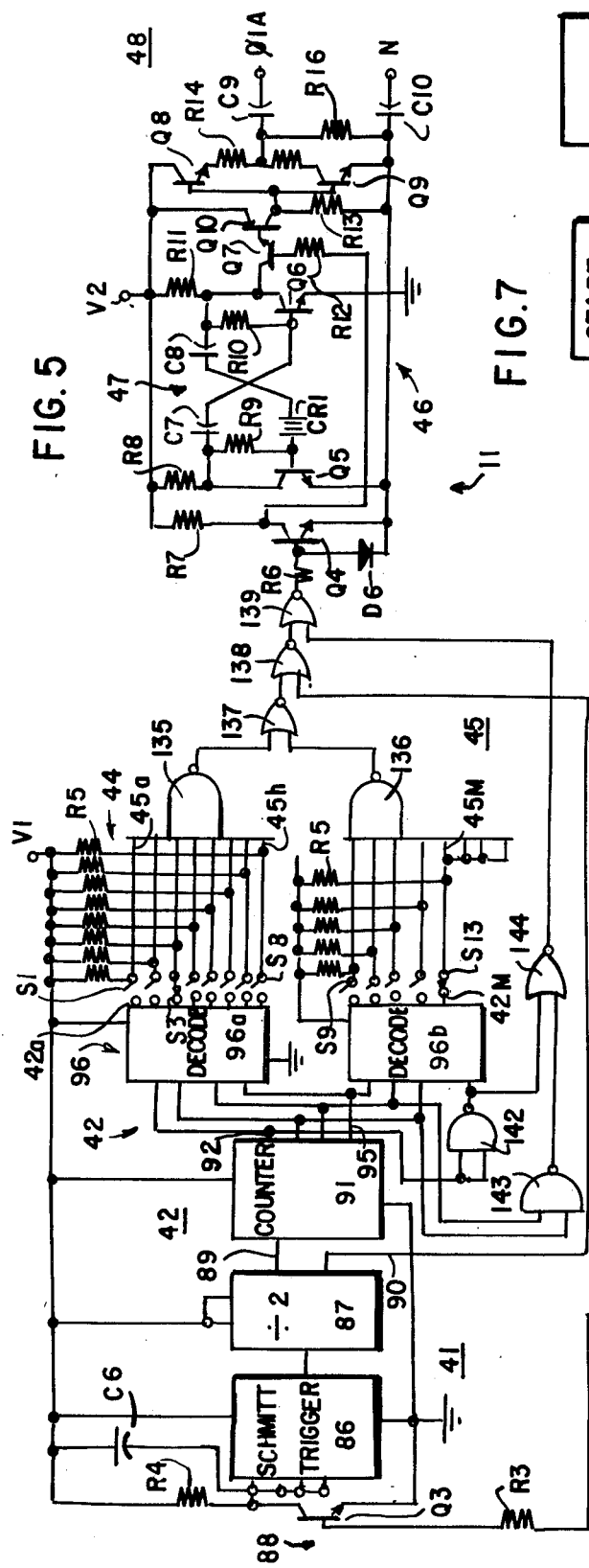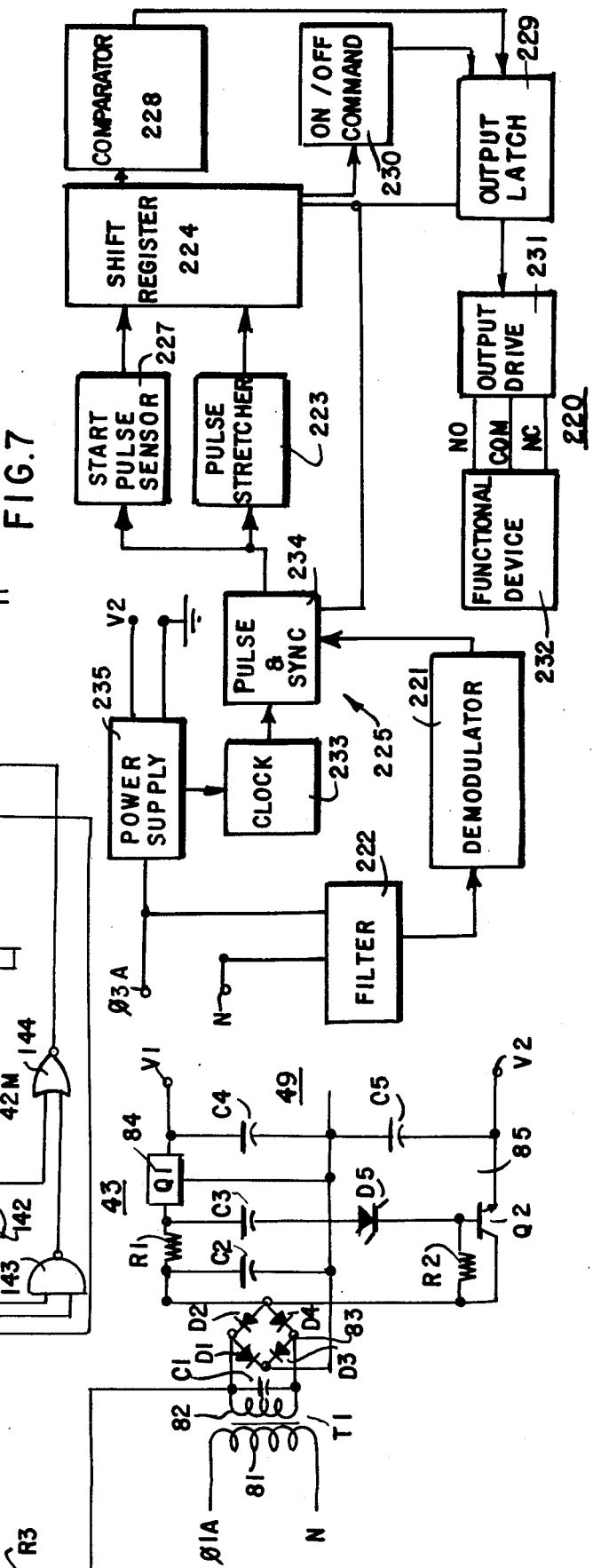
FIG. 5
FIG. 7

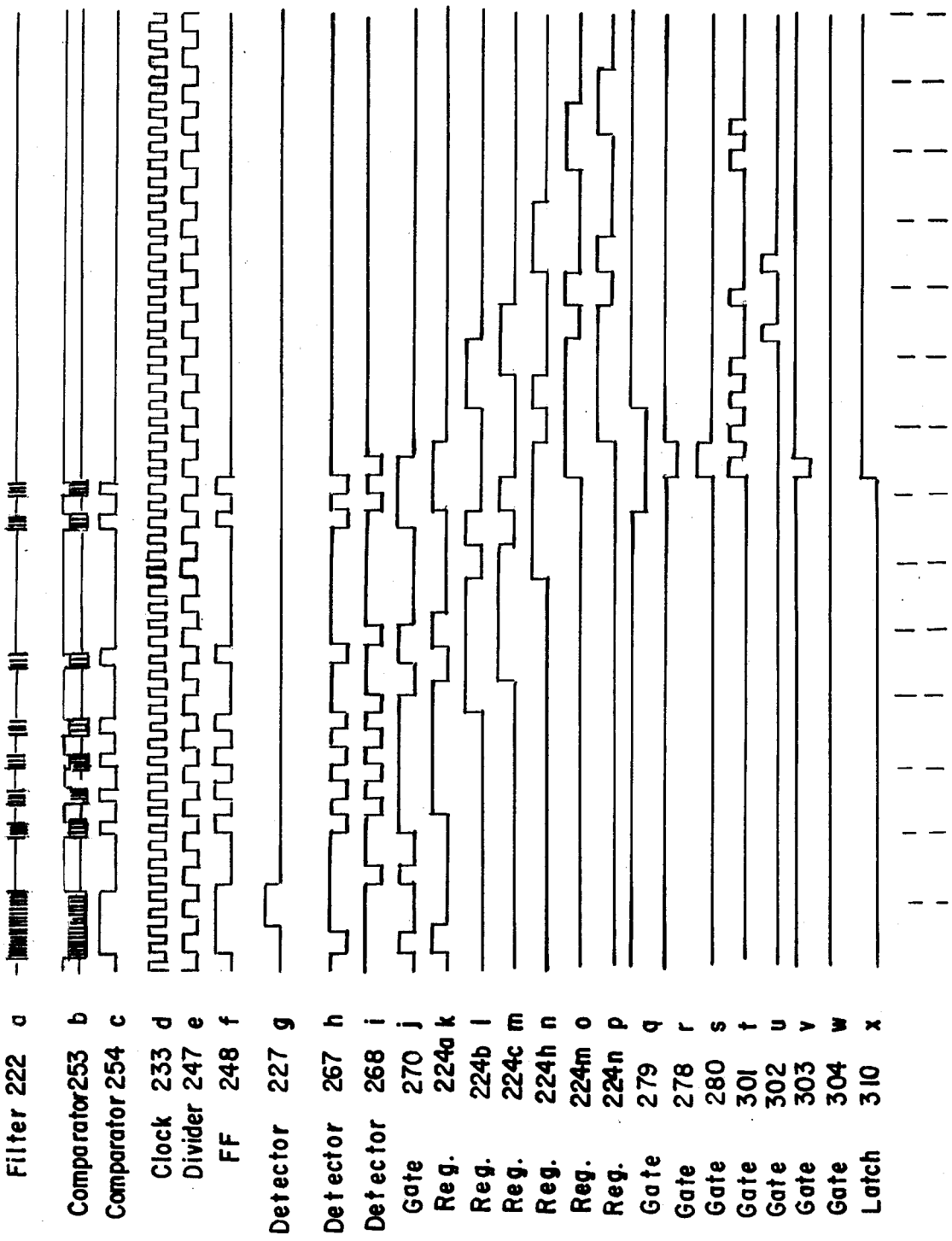

CONTROL SYSTEM EMPLOYING A PROGRAMMABLE MULTIPLE CHANNEL CONTROLLER FOR TRANSMITTING CONTROL SIGNALS OVER ELECTRICAL POWER LINES

BACKGROUND OF THE INVENTION

1. Field of the Invention

This invention relates to supervisory and control systems which employ electrical power distribution lines as a communication link between a transmitter and one or more receivers, and more particularly, to a supervisory and control system including a multichannel transmitter programmable to transmit control pulses in different data channels of a data frame and receivers which are programmable to respond to control pulses in preselected data channels.

2. Description of the Prior Art

Various supervisory and control systems which employ existing electrical power distribution networks for the transmission of information have been proposed for applications including data acquisition, condition monitoring and the control of functional devices, the latter being the most predominant use for such systems. In systems for controlling functional devices, one or more transmitters are operable to provide control signals which are impressed on the power lines and transmitted over the power lines to receivers. The receivers respond to the control signals to effect energization of an associated device, such as a light, a motor or an alarm indicator. The control signals are generally coded to permit selection of a given receiver for enabling operation of a selected device.

Frequency coding techniques are the most common method for providing selective addressing of the receivers. The operating frequencies for known systems range from 255Hz to 400KHz with the majority of systems operating in the 200 KHz range. The systems which employ frequency coding are characterized by various shortcomings. For example, the use of high signal levels for the control signals which are coupled to the power lines to enhance reliable communication usually interferes with the operation of electrical appliances connected to the power lines, and also increases the cost of the system transmitters. The use of low signal levels increases the system susceptibility to electrical noise unless highly sensitive receiver circuits are used in the system. The use of such receivers result in a considerable increase in the cost of the receivers.

Some of the systems have proposed the use of AC power signals to synchronize the operation of the transmitters and receivers. However, the performance of most systems has not been entirely satisfactory primarily due to ever changing impedance characteristics of the power distribution network, phase shift, or signal attenuation for when long transmission distances are involved.

In such applications a further consideration is that most power distribution systems include a multiphase distribution network, and it is generally desirable to communicate from a transmitter connected to one phase of a power transformer to a receiver connected on a different phase of the same power transformer. Signal attenuation in these cases is extremely high, thereby making communication from one phase to the other phase highly unreliable and most difficult to accomplish. It may also be necessary to operate such systems in large buildings where several power transformers may be used to supply the electrical power. In such cases, it is imperative that a provision for transmission of signals from one circuit located on the secondary side of a power distribution transformer to another located on the secondary side of a second distribution transformer is available.

SUMMARY OF THE INVENTION

It is an object of the present invention to provide an improved method of discrete multiple channel communication.

It is a further object of this invention to provide a highly flexible control system that may be readily adaptable in many applications.

A more specific object of the invention is to provide a multiple channel control system which employes existing electric power lines of a building complex as a power supply source and also as the medium of transmission.

Another object of the invention is to provide a means of transmission around power distribution transformers, thereby allowing for communication between isolated sections of large building complexes.

Another object of the invention is to make use of the 60Hz signal present on the power lines for system operation and for the generation of a time reference.

Yet another object of the invention is to provide inexpensive means of coupling to the building power lines.

It is another object of the invention to provide a building power line communication system that is not affected by the ever changing impedance characteristics of the power distribution network.

A further object of the invention is to provide a multiple channel system that is inexpensive to manufacture, easy to install and field calibrate, and at the same time reliable in operation.

These and other objects are achieved by the present invention which has provided a multiple channel control system, including transmitter means coupled to an electrical power line of an electrical power distribution network of a building complex and operable to transmit control signals over the power lines of the network to a plurality of receiver means coupled to one of the power lines and which control the operation of functional devices associated therewith. The transmitter means is operable to selectively provide control signals of the same frequency in one or more of a plurality of data channels which define a data frame, and each receiver means responds to control signals in at least one of the data channels to control the associated functional device. Thus, a single transmitter means selectively controls a plurality of receiver means through the use of a single control frequency.

In one embodiment for a multiple channel control system provided by the present invention, the transmitter means includes timing means, which is coupled to the power lines and is responsive to a plurality of cycles of the AC power signals conducted thereover to define the data channels which comprise the data frames, and output means, which is responsive to the timing means to provide control signals at a predetermined frequency which are coupled to the power lines during selected ones of the data channels for transmission over the power distribution network to the receiver means. The output means includes select means which determines the data channels in which control signals are coupled to the power lines, and thus which receiver means are to be enabled.

Different receiver means are assigned to different data channels, and each receiver means responds to control signals in its assigned data channel to control the associated functional device. Each receiver means includes input means coupled to one of said power lines for detecting the control signals and enabling means which enables the receiver means to respond to control signals in the assigned data channel for controlling the associated functional device. The enabling means includes select means responsive to the AC power signals, to provide an enabling signal at a time following the start of each data frame, which corresponds to the data channel assigned to the receiver means, and comparator means which responds to the coincidence of the enabling signal, to effect the enabling of the functional device. Once enabled, the functional device remains enabled as long as the transmitter means continues to transmit control signals in the data channel assigned to the receiver means. The receiver means includes consecutive pulse detection means which delays the enabling or disabling of the associated functional device until control signals are received or fail to be received in a plurality of consecutive data frames.

The AC power signals are used for the generation of a time reference to permit synchronization of the transmitter means and the plurality of receiver means, and the transmitter means includes pulse counter means which defines the data channels by counting down successive ones of a plurality of cycles of the AC power signals which define a data frame. A start signal generating means of the transmitter means responds to outputs of the pulse counter to generate a start signal at the start of each data frame for transmission over the power lines to all of the receiver means. The select means responds to further outputs of the counter means to effect the transmission of control signals in the selected data channels. Thus, the transmitter means provides data signals, including a start signal and control signals, to the power line in a time referenced sequence with the 60 Hz signal of the AC line being used as the time reference. A start signal detecting means of the receiver means detects the start signal and resets the receiver counter means at the start of each data frame to enable successive counts of the receiver counter to define the data channels for the receiver means. The receiver select means responds to outputs of the receiver counter means to provide the enabling signal for the comparator means.

In accordance with a feature of the invention, the select means of the transmitter means and the receiver means comprise manually operable switches. The transmitter means is programmable through operation of the select switches to effect the transmission of control signals in selected data channels, and the receiver select switches allow any one of the many receiver means used to respond to control signals in any one of the control channels. Moreover, by ganging a plurality of receiver means, any combinations of the control channels may be used to initiate receiver control. In addition, the receiver means may also include more than one comparator means and select switch means enabling simultaneous control of a plurality of functional devices over a plurality of control channels.

A second embodiment for the multiple channel control system employs addressable receiver means, and the control signals provided by the transmitter means represent the address for a selected receiver means and a control command. Each receiver means compares the received address with its assigned address and, if the proper address is received, the receiver means responds to the control command to control the associated functional device. The receiver means includes programmable address select means which permits any receiver means to have any desired address code. This further embodiment for the control system enables a large number of separate communication channels to be provided and in the disclosed embodiment, 1023 separate channels are provided.

In accordance with a further feature of the invention, the output means of the transmitter means includes a signal generating means which provides control signals at a frequency of 120 KHz. The signal which is produced, being of square wave in nature, is transmitted to the power line as such. This enables less power consumption for a larger signal power output due to the concentration of the power during the short on time of the signal. The 120 KHz carrier signal, being a harmonic of the already present 60 Hz signal, is well adapted to the AC line. Thus, transmission is realized over all secondary phase windings of the power transformers of the power distribution network supplying power to the lines. Similarly, reception of this signal is also accomplished through different phase windings of the power transformers. To achieve transmission between isolated phase circuits in which different transformers supply power to separate sections of a large building, capacitive coupling of the transformer secondaries may be used. Thus, control signals may be effectively transmitted and received over the entire power distribution network in a building complex.

In both embodiments, transmitter costs are minimized since only one transmitter means is needed to provide centralized control of any number of receiver means over a large number of functional devices. Also, the receiver means employs filtering circuits and channel discriminators which neither need tuning nor factory adjustment, and the receiver means may all be identically constructed limiting manufacturing costs to a minimum.

DESCRIPTION OF THE DRAWINGS

FIG. 1 is a simplified representation of a multiple channel control system provided by the present invention, and illustrates the connection of a transmitter unit and receiver units of the control system to electrical power lines of power distribution system for a building complex;

FIG. 2 is a block diagram of a typical transmitter unit for the control system shown in FIG. 1;

FIG. 3 is a block diagram of one embodiment for a receiver unit for the control system shown in FIG. 1;

FIG. 4 is a timing chart showing waveforms of signals for the transmitter and receiver units shown in FIGS. 2 and 3;

FIG. 5 is a schematic circuit diagram for the transmitter unit shown in FIG. 2;

FIG. 7 is a block diagram of a second embodiment for a receiver unit for the control system;

DESCRIPTION OF PREFERRED EMBODIMENTS

Figure 6:
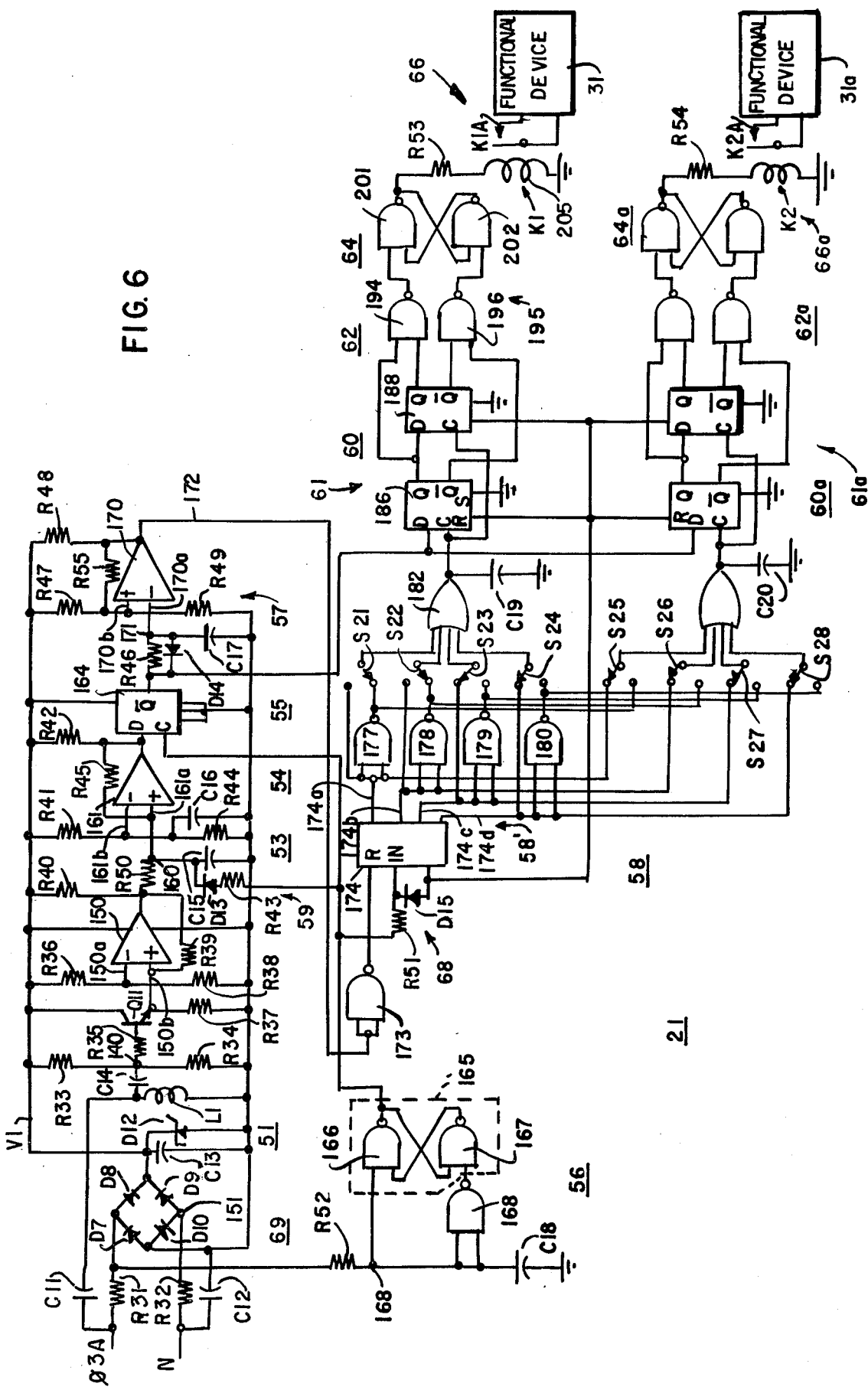
FIG. 6 is a schematic circuit diagram for the receiver unit shown in FIG. 3.

Referring to FIG. 1, the multi-channel communication system 10 of the present invention includes a programmable multi-channel digital controller or transmitter 11 which is operable to generate control signals which are conducted over the electrical power distribution lines of a building complex to actuate a plurality of receivers, such as receivers 21 and 22 which control the operation of associated functional devices 31 and 32, respectively. While only two receivers 21 and 22 and two functional devices 31 and 32 have been shown in FIG. 1 in the illustrative embodiment, a large number of such receivers and functional devices are employed in a typical application.

By way of example, the communication system 10 may be used to control clocks, bells or alarm devices as employed in schools or industrial complexes. Alternatively, the system 10 may be used to control the energization of functional devices such as electric lights, electrical motors, and the like. The system 10 may also be adapted for use in fire alarm, burglary alarm, or monitoring systems.

In the exemplary embodiment, the power distribution system for the building complex includes a plurality of electrical services, such as service A, service B, . . . service M, each of which provides electrical service to different areas or zones of the building complex. Each service, such as service A, includes a power distribution transformer 12 having a primary winding 13 and a secondary winding 14. The primary winding 13 is shown connected to 3-phase outputs 01–03 of a 4.16Kv to 480v main transformer 15 which supplies power to the building complex. The secondary winding 14 derives a 3-phase output over phase conductors 01, 02 and 03 and a neutral conductor N that feed into the distribution system over a switch box 16. At this point, the AC power may be any combination of phases and neutral and, for example, may provide the 110/120 VAC power for a given portion of the building.

The other electrical services, B, . . . M, also include power distribution transformers, such as transformer 12 for service A, which provide 3-phase outputs over lines 01B–03B and 01M—03M and neutral lines N which extend to supply power to other areas of the building.

In the exemplary embodiment, transmitter 11 is shown connected between phase conductor 01A and the neutral line of service A, receiver 21, is shown connected between phase conductor 03A and the neutral line N of service A, and receiver 22 is shown connected between phase conductor 03B and the neutral line of service B.

Transmission from the transmitter, which is connected to one phase of the power distribution transformer 12 (phase 1) to the receiver 21 connected to a different phase of transformer 12 is provided directly.

For the purpose of permitting coupling between the phase conductors of service A and those of services B, . . . M, capacitors, such as capacitors CB and CM, are provided to couple one of the phases of secondary windings of the power distribution transformers with phase 1 of transformer 12 enabling the signal output of the transmitter 11 to be extended over the secondary windings of the power transformers associated with the other services B, . . . M.

In accordance with an exemplary embodiment, the transmitter 11 is operable to transmit control signals during a data frame which is defined by a plurality of cycles of the AC signals. Each data frame is in turn subdivided into a plurality of data channels, thirteen in the exemplary embodiment, all referenced to the AC power signals. The transmitter 11 is operable during each data frame to generate a start pulse at the start of the data frame, followed by any combination of up to thirteen consecutive data pulses, the presence of a data pulse coincident with a data channel causing the transmission of control signals in such data channel. The transmitter 11 is selectively controllable to determine the data channels in which control signals are transmitted, thereby permitting selection of the receivers which are enabled.

Different receivers are set to respond to control signals transmitted in a different data channel for controlling the associated functional devices. The detection of the start pulse prepares the receiver to detect control signals in the data channel assigned to such receiver. For example, receiver 21 may be set to respond to control signals transmitted in the third data channel, and receiver 22 may be set to respond to control signals transmitted in the thirteenth data channel. A plurality of receivers may be set to respond to a given data channel, and by ganging a plurality of receivers, any combination of the thirteen control channels may be used to initiate receiver control of a functional device.

TRANSMITTER

Referring to FIG. 2, the transmitter 11 and the receivers 21 and 22 are synchronized by the 60 Hz power signals conducted over the power distribution lines. The transmitter 11 includes a power supply 49 which derives from the AC power signals, a DC signal at level V1 which is extended to a clock 41, a step counter 42, a start pulse coder 43, a channel selector 44, and a mixer 45 of the transmitter 11, and a DC signal V2, which is supplied to an output circuit 39 of the transmitter 11, including a modulator 46, an oscillator 47 and an output buffer 48.

As indicated in line A of FIG. 4, which shows the waveform for the AC power signals conducted on the power lines, each data frame consists of 32 cycles of the AC signal. The transmitter clock circuit 41 responds to the AC power signals which define a data frame to provide sixteen clock pulses at a 30 Hz rate which are shown in line C of FIG. 4. The first two clock pulses define a 66.666 millisecond duration, in which time a start pulse is generated. The next thirteen clock pulses define the data channels, each 16.666 milliseconds in duration, during which times the transmitter 11 is selectively operable to transmit control signals in a time referenced sequence. In the present example, the transmitter 11 provides data pulses in the third and thirteenth data channels as shown in line D of FIG. 4, causing the generation of control signals, shown in line E of FIG. 4, which are conducted over the power lines to the receivers.

The start pulse and the control signals provided by the transmitter 11 are square wave in nature and at a frequency of 120 KHz, which is a harmonic of the 60 Hz power signals. This enables less power consumption for a larger signal power output and enhances transmission capabilities over different phase windings of the plurality of power distribution transformers of the electrical wiring system.

More specifically, the 30 Hz clock pulses provided by clock 41 are extended to step counter 42 which counts down the clock pulses and provides pulses over line 42n to the start pulse coder 43 and over lines 42a–42m to the channel selector 44. The start pulse coder 43 is enabled at a predetermined count of the step counter 42 to provide a control ouput, (FIG. 4, line D), over the mixer 45 to the modulator 46. The modulator 46 when enabled permits the frequency output of the oscillator 47, which provides frequency signals at the 120 KHz rate, to be extended to the power line over the output buffer circuit 48 as indicated in line E of FIG. 4.

The channel selector 44 selectively extends the outputs of the step counter 42 provided over lines 42a–42m to the mixer 45 over individual lines 45a–45m to select one or more of the thirteen data channels in which control signals are to be transmitted. The channel selector 44 may comprise a plurality of programmable switches S1–S13, shown in FIG. 5, each individually operable to complete a signal path between one of the outputs 42a–42m of the step counter 42 and the corresponding input line 45a–45m of the mixer 45, a separate signal path corresponding to each data channel. As the step counter 42 counts down the clock pulses for each data frame, a pulse is provided on each of the output lines 42a–42m in sequence. Each of the pulses is extended to the mixer 45 if the associated selector switch S1–S13 is operated. In the present example, where receivers 21 and 22 are set to respond to control signals transmitted during the third and thirteenth data channels, respectively, switches S3 and S13 are operated, and outputs provided by the step counter 42 over paths 42c and 42m and extended over paths 45c and 45m to the mixer 45. Accordingly, at the time the pulses are provided to the modulator 46, the 120 KHz signal provided by the oscillator 47 is passed to the power line for a time corresponding to the duration of the 30Hz clock pulse, which defines the data channel, providing the output to the power line shown in line E of FIG. 4. The transmitter 11 continuously generates the start pulse and data pulses in accordance with the settings of the selector switches S1–S13 of the channel selector 44.

While only one transmitter 11 is employed in the system 10 shown in FIG. 1, it is apparent that in certain applications, such as in fire or burglary alarm systems or in monitoring systems, it may be desirable to employ a plurality of transmitters each controlling one or more receivers, depending upon system requirements.

RECEIVER

Referring to FIG. 3, each receiver detects the data, including the start pulse and the control signals, transmitted over the power line, and responds to the control signals having assigned coding for the receiver to effect operation of one or more functional devices associated therewith. Each receiver, such as receiver 21, includes an input stage 50, including a filter circuit 51, a voltage level detector 52, a noise filter 53 and a pulse shaper 54, which receives control signals conducted over the power line and recovers the data pulses from the AC signals. The output of the pulse shaper 54 is extended to a time reference pulse shifter 55 which receives a further input from a clock circuit 56 which derives clock pulses at a 60 Hz rate from the AC power signals, for enabling the time reference phase shifter 55 to synchronize the data as received by the receiver with the receiver clock pulses.

A pulse width limiter 59 is responsive to the 60 Hz clock pulses to provide a control output to the noise filter 53 for limiting the detected signal to the proper width and assuring a proper signal level during clocking times.

A start pulse detector 57 connected to the output of the time reference pulse shifter 55 responds to the start pulse to reset a programmable channel selector 58 to enable the detection of control signals within the data channel assigned to the receiver 21.

The programmable channel selector 58 includes a counter-decoder circuit 58' shown in FIG. 6, and programmable switches S21-24, which are selectively operable to code the receiver 21 to a given data channel. The counter-decoder 58' of the programmable channel selector 58 is driven by the clock 56 and is operable in a manner generally similar to step counter 42 and channel selector 44 of the transmitter 11 to provide a control output at a time referenced to the AC power signals, corresponding to the data channel assigned to the receiver 21.

The control output provided by the channel selector 58 is extended to channel count decoder circuits 61 including a channel comparator 60 which also receives the output of the time reference pulse shifter 55 and serves as a coincidence detector for enabling a latch circuit 64 upon coincidence of a control output and a data pulse in two or more consecutive data frames as indicated by a consecutive channel pulse detecting circuit 62. When the latch circuit 64 is set, a control output is provided to an output circuit 66 for enabling the functional device 31. As indicated in FIG. 3, more than one functional device may be controlled by a given receiver through the provision of separate channel count decoder circuits for each device to be controlled, such as channel comparator 60a, consecutive pulse detector 62a, latch circuit 64a and output circuit 66a for device 31a.

A missing signal detector 68 responds to the lack of control signals in the assigned data channel of a given data frame to effect the disabling of the functional device 31.

The receiver 21 includes a power circuit 69 responsive to the AC power signals conducted over the power lines to provide a DC signal at level V1 for energizing the receiver circuits.

By way of description of the receiver operation, it is assumed that the transmitter 11 is providing control signals in the data channel, assigned to receiver 21, that is, the third data channel. The start pulse and control signals transmitted over the power lines by the transmitter 11, are recovered from the 60 Hz power signals conducting on the power lines by the filter 51 and the voltage level detector 52 which discriminate between noise and data signals. The filter 51 also eliminates normal line transients and noise so that the output of the voltage level detector 52 is a frequency identical to that of the transmitted signal and is maintained at a peak-to-peak level equal to the receiver supply voltage V1.

The noise filter 53 and pulse shaper 54 convert the 120KHz signal output of the voltage level detector 52 to logic level pulses corresponding in width to the duration of the tone bursts which define the start pulse and the control signals. The output of the pulse shaper 54 is extended to the time reference phase shifter 55 which is driven by clock pulses at a 60 Hz rate to provide a logic level output which is an exact replica of the transmitted data provided by the transmitter 11, as shown in line D of FIG. 4, and is referenced to the 60 Hz receiver clock.

The start pulse detector 57 responds to the start pulse provided at the output of the time reference pulse shifter 55 at the start of each frame to reset the programmable channel selector 58. Thereafter, the channel selector 58 responds to the next series of 60 Hz clock pulses to provide a control output to the channel comparator 60 in response to the third clock pulse, which designates the third data channel.

Accordingly, after detection of the start pulse, the programmable channel selector 58 maintains the channel comparator 60 inhibited during the time corresponding to the first and second data channels. At the start of the third data channel, the control signals are detected by input circuits 50 and extended to the time reference pulse shifter 55 which provides a logic level output to the channel comparator 60. At such time, the channel selector 58 provides a control output to the channel comparator 60 which responds to the coincidence of the control output and the data output provided by the time reference pulse shifter 55 to enable the consecutive channel pulse detector 62, and when coincidence is detected between data pulses and control outputs of the channel selector 58 in two successive data frames, by the channel comparator 60, the consecutive channel pulse detector 62 sets the latch circuit 64 to effect energization of the functional device 31 over the output circuit 66. Thereafter, the receiver 21 maintains the device 31 energized as long as the transmitter 11 continues to transmit control signals during the third data channel.

Two consecutive data channel pulses must be absent to deenergize the output drive circuit. This eliminates the possibility of false tripping in that control signals must be missing or received in two successive data frames to change the output state of the receiver 21.

In the case of the total loss of the transmitted signal, the output stage remains in the state accomplished previous to the signal loss. To assure a proper output state when transmitter signal loss has occurred, the missing signal detector 68 disables the counter of the channel selector 58 and effects the reset of the consecutive pulse detector circuit 62.

DETAILED DESCRIPTION

Referring to FIG. 5, the transmitter 11 is coupled to the power line over a transformer T1 having a primary winding 81 connected in series with the power lines 01A and N, and a secondary winding 82 connected to a full wave bridge rectifier circuit 83, including diodes D1-D4, and a filter capacitor C1 of the power supply circuit 49. The output of the bridge rectifier 83 is connected to a low voltage supply 84 comprised of transistor Q1 which provides an output at level V1, which may be +5 vdc for the logic level circuits of the transmitter 11. A further supply 85, including a transistor Q2 and zener diode D5 provides a high voltage output at level V2, which may be 12 vdc for the output circuits of the transmitter 11.

The 60 Hz AC signal which is used as the time reference for the system 10, is interfaced into the transmitter 11 through the clock converter stage 41. The clock comprises a Schmitt trigger circuit 86, a pulse divider circuit 87 and a detector circuit 88. The detector 88 includes a transistor Q3 having its base connected over a resistor R3 to the secondary winding 82 of transformer T1 for sensing the 60 Hz signal conducted over the power lines. The collector of transistor Q3 is connected over parallel connected resistor R4 and capacitor C6 to V1, and the emitter of transistor Q3 is connected to ground. Transistor Q3, which is normally non-conducting, is rendered conductive by the positive going portion of each AC cycle to provide a pulse input to the Schmitt trigger circuit 86 which responsively provides pulse outputs at a 60 Hz rate. The 60 Hz pulse output of the Schmitt trigger circuit 86 is extended over divider circuit 87 which performs a divide-by-two function providing clock pulses at a 30Hz rate at an output 89 thereof and the complement at an output 90 of the divider circuit.

The divided clock pulse at a frequency of 30 Hz is extended to the step counter 42 which includes a pulse counter 91, such as the Type Ser. No. 7493, 4-Bit Binary Counter commercially available from Texas Instruments. The counter 91 counts the number of clock pulses from the first to the sixteenth pulse in succession and provides a BCD code over outputs 92-95 thereof which is indicative of the pulse count.

The BCD code provided over outputs 92-95 is translated by code translators 96 of the step counter 42 and transformed into logic 0 states which appear at successive outputs 42a-42m of the code translators 96 as logic 0 levels. The code translators 96 may, for example, be the Texas Instruments Type Ser. No. 7442 BCD to Decimal Decoder.

The decimal outputs, which are thirteen in number, are extended to the channel selector 44 which is comprised of thirteen switches S1-S13 which are selectively operable to select one or more of the thirteen output paths 45a-45m for permitting pulses to be passed to the modulator 46 over the mixer 45.

The mixer 45 is comprised of a pair of NAND gates 135 and 136 which have inputs connected over resistors R5 to V1 such that gates 135 and 136 are normally enabled, providing logic 1 level outputs. The outputs of the NAND gates 135 and 136 are combined over a NOR gate 137, the output of which is connected as a first input to a NOR gate 138 which receives a second input from the complementary output 90 of the clock 41, which synchronizes the passage of data pulses to the modulator 46. The output of the NOR gate 138 is in turn extended to an input of a further NOR gate 139 which has a second input connected to an output of the start pulse coder 43 to pass either data pulses or the start pulse to the base of transistor Q4 of the modulator circuit 46. The start pulse coder 43 includes a pair of NAND gates 142 and 143 and a NOR gate 144 which decode counts fourteen through sixteen of the counter 42 to inhibit the NOR gate 139 to effect the transmission of the start pulse.

The output of the gate 139 is connected over a resistor R6 to the base of a transistor Q4 of modulator 46. A blocking diode D6 is connected between the base of transistor Q4 and ground to prevent the V2 supply from filtering back to the logic circuits.

Transistor Q4, which has its collector connected over resistor R7 to V2 and its emitter connected to ground, is normally maintaned conducting and is rendered non-conductive in response to each pulse provided over the gate 139. Thus, the state of transistor Q4 is controlled to yield a logic zero state to transistor Q4 for the time corresponding to the start pulse and each channel pulse. This pulse sequence as seen by transistor Q4 controls the state of a transistor Q7 of the modulator 46, which has its base connected over resistor R12 to the collector of transistor Q4, its collector connected over resistor R11 to V2 and its emitter connected to base of transistor Q10 of the output buffer stage 48. Transistor Q7 is enabled whenever transistor Q4 is disabled, permitting the frequency output of the oscillator 47 to be extended to the output buffer stage 48. The oscillator 47 is a crystal controlled oscillator including transistors Q5 and Q6, a crystal CR1 and resistors R8–R11, capacitors C7–C8 which is operable to provide a square wave output at 120KHZ. The frequency output of the oscillator is extended over transistor Q7 as enabled to transistor Q10 which is connected as an emitter follower. Transistor Q10 comprises an input stage of the buffer circuit 48 which has push-pull stage comprised of transistors Q8 and Q9. The output of the buffer stage 48 is coupled to lines 01A and N of the power line over capacitors C9 and C10.

Transistor Q4 is disabled for the duration of the start pulse and thus transistor Q7 is maintained enabled permitting the 120KHZ output of the oscillator 47 to be extended over the output buffer stage 48 to the transmission line. At the termination of the start pulse, Nor gate 139 is disabled, enabling transistor Q4 thereby cutting off the modulator transistor Q7 and terminating transmission of the high frequency signal. Whenever a channel select pulse is extended to gate 139 during selected data channels, transistor Q4 is again disabled, reenabling transistor Q7 to permit the transmission of the high frequency signal during the selected data channel.

RECEIVER

Referring to FIG. 6, the receiver 21 is connected to phase conductor 03A and the neutral conductor N of the power line. The power supply 69 includes a full wave bridge rectifier 151 which is connected to conductors 03A and N over resistors R31 and R32. The bridge rectifier 151 provides AC line isolation. A capacitor C13 and a Zener diode D12, which are connected across outputs of the bridge circuit 151 provide a regulated voltage at level V1 for the receiver 21.

The input filter 51 of the receiver 21 is coupled over capacitors C11 and C12 of the power line. The filter 51 includes an inductor L1 and a capacitor C14 which recover the high frequency signals from the AC power signals conducted over the power line. Inductor L1 has one end connected over capacitor C11 to conductor 03A and its other end connected over capacitor C12 to the neutral conductor N of the power line. Capacitor C14 is connected between the junction of capacitor C11 and inductor L1 and the junction of resistors R33 and R34 at point 140 which are connected between V1 and ground forming a voltage divider which references the high frequency control signals to a DC level at the input of the emitter-follower amplifier comprised of transistor Q11. The base of transistor Q11 is connected over resistor R35 to point 140. Transistor Q11 has its collector connected to V1 and its emitter connected over a resistor R37 to ground. Transistor Q11 limits the peak-to-peak signal level so that of the DC supply voltage V1 to eliminate false triggering of the level detector 52, embodied as a comparator circuit 150, such as one stage of a Motorola Type MC3302 Quad Comparator. The comparator circuit 150 has one input 150a connected to a reference voltage divider comprised of resistor R36 and R38 which are connected in series between V1 and ground. The other input 150b of the comparator 150 is connected to the output of the emitter-follower amplifier at the emitter of transistor Q11. The output of the comparator 150 is referenced to a DC level over resistor R40 and is fed back over resistor R39 to input 150b.

The comparator circuit 150 responds to high frequency signals extended thereto which are of an amplitude above that of normal ambient noise levels of the AC line, and changes state at its output. Since control signals in the proper high frequency range are effected by the Q of the filter 51, comprised of inductor L1 and capacitor C14, only such signals have an amplitude sufficient to effect switching of the comparator circuit 150. The comparator circuit 150 provides a frequency output identical to that of the transmitted signal frequency and is maintained at a peak-to-peak level equal to supply voltage V1.

The noise filter 53, is comprised of a capacitor C15 and a resistor R50. Resistor R50 is connected between the output of the comparator circuit 150 and an input of the pulse shaper circuit 54 at point 160. Capacitor C15 is connected between point 160 and ground. The noise filter 53 receives the frequency signal output of the level detector 52 and provides pulses with a repetition rate that is identical to that of the pulses transmitted by the transmitter 11. A diode D13 and a resistor R43 which comprise the pulse limiter circuit 59, control the potential at point 160 to compensate for the large damping components of the noise filter. The large damping components of the noise filter 53 are provided to eliminate any random noise generated on the power lines from effecting the receiver circuit 21. Diode D13 and resistor R43 control the charging of the capacitor C15 immediately after transmitted data pulses terminate, to limit the signal pulse to the proper width and assure proper signal level during the clocking time. The pulse width limiter 59 also clamps the capacitor voltage C15 high at times when signal pulses are absent, assuring noise immunity during such intervals.

The pulse shaping circuit 54 is embodied as a comparator circuit 161, such as the one stage of a Motorola Type MC3302 Quad Comparator, which has one input 161a connected to point 160 and a second input 161b connected to the junction of resistors R41 and R44, which are serially connected between V1 and ground to provide a reference level for the comparator circuit 161 for biasing the comparator circuit 161 normally off. The comparator circuit 161 is turned on in response to an increase in the potential at point 160 as the result of the charging of capacitor C15 in response to the receipt of the start pulse or a data pulse.

The output of the comparator circuit 161 is applied to the data input of a data latch circuit 164 which comprises the time reference pulse shifter 55. The data latch circuit 164, which may be one stage of the type CD4013 Dual D Flip Flop, commercially available from National Semiconductor, has a clock input connected to the output of the receiver clock 56 to receive clock pulses at a 60 Hz rate provided by the receiver clock 56. The receiver clock 56 includes a latch circuit 165, comprised of NAND gates 166–167, which receives the 60 Hz AC signal and shapes the power signal to provide clock pulses at the 60 Hz rate. Positive half cycles of the AC signals are extended from conductor 03A over resistors R31 and R52 to an input of gate 166, which serves as a set input for the latch 164. Negative half cycles of the AC signals are extended from conductor 03A over resistors R31 and R52 and an inverter 168 to an input of gate 167 which serves as a reset input for the latch 164.

The time reference pulse shifter 55 responds to clock pulses at the 60 Hz rate and to data pulses provided at the output of comparator circuit 161 of the pulse shaper 54 to provide an exact replica of the logic signal generated by the transmitter 11, which is applied to the start pulse detector 57 and to the channel comparator 60. Digressing, the transmitted signal is generated in phase with the 60 Hz AC line signal at the transmitter 11. When this signal is detected at the receiver 21, the relative phase angle of the 60 Hz AC line signal at the receiver 21 may be shifted by multiples of 120° C with respect to the transmitted signal due to the phase shifting of the 60 Hz AC line signal used as a reference. The noise filter 53 (resistor R50 and capacitor C15), under the control of the pulse limiter circuit 59 (resistor R43 and a diode D13), compensates for this by sampling and holding a signal pulse until such a time when the 60 Hz AC line reference at the receiver has been sensed. This is essence delays the signal pulses and aligns the phase between each pulse and the 60 Hz signal.

The start pulse detector 57 is comprised of an integrating network including a resistor R46, a diode D14 and a capacitor C17 and a pulse shaping circuit, embodied as a Type MC3302 Quad Comparator 170. Resistor R46 is connected between the false output Q of latch 164 and one input 170a of the comparator circuit 170 at point 171. Diode D14 is connected in parallel with resistor R46. A reference signal is supplied to the other input 170b of the comparator circuit 170 by way of voltage dividing resistors R47 and R49, which are connected in series between V1 and ground, and normally bias the comparator circuit 170 off. The output of the comparator circuit 170 is connected over a resistor R48 to V1, and over a feedback resistor R55 to the input 170b of the comparator circuit.

Capacitor C17 is charged by the signal output of the latch circuit 164 and since the start pulse duration is four cycles of the AC signal, the charging current is sufficient to raise the potential at point 171 to a value which enables the comparator circuit 170 to turn on, providing an output which is extended over line 172 and inverter 173 to a reset input of a counter 174 at the programmable channel selector 58. At the end of the start pulse, diode D14 discharges capacitor C17 and the comparator circuit 170 is thus disabled, removing the reset signal from the counter 174.

The programmable channel selector 58 includes counter 174, decoding gates 177–180, programmable select switches S21–S24, and a gate 182. The counter 174, which may be the National Semiconductor Type CD4024 7 stage Binary Counter, has an input connected over a resistor R51 to the output of the clock 56 and is operable to count down the 60 Hz clock pulses, and provide BCD coded levels at outputs 174a–174d which are decoded by four NAND gates 177–180 and select switches S21–S24 for controlling NOR gate 182.

The BCD coding switches S21–S24 are selectively positionable to connect one or more of the gates 177–180 between counter 174 and gate 182, or to bypass one or more of the gates 177–180 to selectively extend timing pulses to the channel decoder circuit 61. Thus, as the counter 174 is stepped by the 60 Hz clock pulses, the BCD outputs of the counter 174, as decoded by gate 177–180 and select switches S21–S24, control gate 182 to provide a timing signal to an input of the channel comparator 60 of channel decoder circuit 61, which is indicative of the data channel assigned to receiver 21. The chart given in Table I shows one relationship between switch closures and count pulse selection as employed in the illustrative embodiment.

TABLE I

| Channel | Switch Position | | | |
|---|---|---|---|---|
| | S21 | S22 | S23 | S24 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |

The channel comparator circuit 60 includes a pair of data latch circuits 186 and 188, such as the National Semiconductor Type CD4013 Dual D Flip Flop. The clock input of latch 186 is connected to the output of control gate 182 to receive the timing pulses.

The data input of the data latch 186 is connected to the false outut of Q of the time reference pulse shifter 55 to receive the data pulses. When coincidence is detected between a data pulse extended to the data input and the count of the counter 174, the latch 186 changes state. When the counter 174 reaches the specified count again during the next frame, the state of the latch 186 is transferred to the other data latch 188 of the channel comparator 60, which has its clock input connected to the output of the control gate 182 and its data input connected to the true output Q of latch circuit 186. Whenever a channel pulse is received in two consecutive data frames, both latches 186 and 188 are set.

The consecutive pulse detector 62 of the channel decoder circuit 61 includes NAND gates 194 and 196 which are connected for operation as an Exclusive OR circuit 195. Gate 194 has an input connected to the true output Q of latch 186 and a further input connected to the true output Q of latch 188. Gate 196 has an input connected to the false output Q latch 186 and a second input connected to the false output Q latch 188. The Exclusive OR circuit 195 is enabled whenever both latch circuits 186 and 188 are set to apply a pulse to the latch circuit 64 of the channel decoder circuit 61, which comprises a pair of NAND gates 201 and 202, setting the output latch circuit 64 high. The output latch circuit 64 in turn controls energization of relay K1 of the output circuit 66, which has its operating coil 205 connected in series with a resistor R53 between the output of the output latch 64 and ground. The relay K1 has contacts K1-A connected to the functional device 31.

The missing signal detector 68 comprises resistor R51 and diode D15 and is operable to disable the counter 174 and reset the latch 188 whenever a signal loss has occurred. Counter 174 counts 60 Hz clock pulses which are presented to the counter 174 by way of resistor R51. If during transmission the entire signal is lost, a logical one state will be presented to diode D15 at a time referenced by counter 174 which would exceed the time that a start pulse would appear. This pulse then stops the 60 Hz clock pulses into 174 and resets the comparator circuit 60 to the off condition.

The elements of the further channel count decoder 61a, including channel comparator 60a, consecutive pulse detector 62a, output latch 64a, and output circuit 66a are the same as those of the output channel count decoder 61 described above. However, the associated channel select switches S25–S28 are operated to provide a different selected pulse count of the counter 174 for effecting the enabling of the relay K2 of the output circuit 66a which controls functional device 31a over contacts K2-A.

OPERATION

Referring to FIGS. 4 and 5, the power signals, which are conducted over power conductors O1A and neutral N, are coupled over transformer T1 to the base of transistor Q3. Transistor Q3 is enabled by the positive going half cycles of the AC power signals (FIG. 4, line A) to trigger the Schmitt trigger circuit 86 which provides output pulses at a 60 Hz rate, shown in FIG. 4 at line B. The 60 Hz pulse output of the Schmitt trigger 86 is divided by two by pulse divider circuit 87, which provides clock pulses at a 30 Hz rate, shown in line C of FIG. 4, at output 89, and the complement of such output at output 90.

The counter 91 counts down the 30 Hz pulses and provides binary coded levels at outputs 92–95 representing the number of clock pulses counted. The translators 96 decode such outputs providing logic 0 levels over outputs 41a–42m in succession, with counts 1–13 defining the data channels. The start pulse is initiated to a logical one position as the clock pulse count 14 goes to a logical zero state and remains in a logical one state until the end of count 16 due to the sequencing provided by the step counter 42, the start pulse coder, 43 and the mixer 45 under the control of clock 41. In the exemplary embodiment, wherein the transmitter select switches S3 and S13 are set to enable transmission of control signals during the third and the thirteenth data channels, when counter 91 reaches a count of three, the output on line 42c goes to logic 0 level which enables the output of gate 135 to go high, causing the output of gate 137 to go low. Accordingly, gate 138, which receives the complementary clock pulse from the output 90 of divider circuit 87 is enabled for the duration of such clock pulse, causing the output of gate 139 to go high. When gate 139 is enabled, transistor Q4 is turned off, removing ground from the base of transistor Q7, which turns on. When transistor Q7 turns on, the 120 KHz frequency output of the oscillator is extended over the collector-emitter circuit of transistor Q7 and the output buffer circuit 48, including emitter-follower amplifier Q10 and push-pull stage (Q8–Q9) and coupled to the power lines over capacitor C9 and C10.

At the end of the clock pulse corresponding to select switch S3, gate 138 is disabled, causing the output of gate 139 to go high enabling transistor Q4 whereby transistor Q7 is disabled terminating the passage of the 120 KHz signal to the power lines. The counter 91 continues to step in response to further clock pulses provided by clock pulse circuit 41. When the thirteenth count is reached, the logic level signal provided at output 42m is extended over switch S13 to control gates 136–139, causing transistor Q4 to be cut off whereby transistor Q7 is enabled, permitting the 120 KHZ frequency signal to be extended to the power line for the time which defines data channel 13. Gate 138 is again disabled at the end of the clock pulse reenabling gate 139 so that transistor Q4 conducts causing transistor Q7 to be cut off thereby terminating transmission of the frequency signal.

For the counts of 15–16, the outputs of the decoder gates 142–143 are low whereby gate 144 is enabled causing 139 to be disabled turning off transistor Q4 for such duration. Accordingly, transistor Q7 is enabled to permit the generation of the start pulse as indicated in line E of FIG. 4. Since gate 139 is controlled only by the decoder gates and outputs of the counter and not by the outputs of the clock, the start pulse is continuous for two clock pulse durations providing the 66.666 millisecond pulse.

Referring to FIG. 1, the start signals including the start pulse and the data signals conducted over conductors O1A and the neutral N are coupled to phase conductor O3A through transformer secondary windings to enable reception of such signals by the receiver 21 which is connected between phase conductor O3A and the neutral conductor N. The signals are also coupled over capacitors CB–CM to phase conductors O1B–O3B and O1M–O3M of services B . . . M.

Referring to FIG. 6, the high frequency signals representing the start pulse and the control signals which are modulated onto the AC power signals are received over conductor O3A and the neutral conductor N at the input of receiver 21 and are coupled over capacitors C11 and C12 to filter 51, including inductor L1 and capacitor C14, which recovers the 120 KHz signal from the 60 Hz power signals. The high frequency signal is referenced to a DC level at point 140 as shown in FIG. 4 at line F, and is extended over emitter-follower amplifier comprised of transistor Q11 to the non-inverting input of the comparator circuit 150 of the voltage level detecting circuit 52. Each tone burst, representing the start pulse or any other data pulses causes the comparator circuit 150 to turn on at such frequency, providing a square wave pulse output which is extended to noise filter 53, comprised of resistor R50 and capacitor C15. Capacitor C15 filters the high frequency output and provides a DC level of a duration corresponding to the duration of the tone burst at input 161b of comparator circuit 161 to turn on for the duration of such level.

The start and data pulses (FIG. 4, line G) are provided at the output of comparator 161. Flip-flop 164 of the time reference pulse shifter 55 switches states on the next 60 Hz clock pulse provided by the receiver clock 56 to provide a logic level output which is identical to the output (FIG. 4, line D) provided by the transmitter 11.

The start pulse as extended over resistor R46 to point 171, causes capacitor C17 to charge, raising the potential provided at point 171. When the potential at point 171 exceeds the turnon threshold for comparator circuit 170, as established by resistors R47 and R49, comparator circuit 170 turns on, providing a reset pulse which is extended over line 172 and inverter 173 to the counter 174 of the programmable channel selector 58.

At the end of the start pulse, diode D14 discharges capacitor C17 causing comparator circuit 170 to be turned off. Thereafter, the counter 174 responds to further 60 Hz clock pulses to count down such pulses providing outputs to decoder gates 177–180.

Decoder gates 177–180 providing a BCD count, provide an initiate pulse at the output of gate 182 determined by the position of switches S21–S24. This initiate pulse is coincident in time to one of the 13 data pulses as interpreted by switches S21–S24. In the exemplary embodiment, logic 1 levels at outputs 174a–174b which are inverted by gates 177 and 178 are extended over switches S21 and S22 to inputs of gate 182, which is then enabled by logic 0 levels provided at outputs 174c–174d of the counter 174 and extended over switches S23–S24 to further inputs of gates 182, causing the output of gate 182 to go high, FIG. 4, line H.

At such time, the data pulse transmitted in the third data channel is provided at the output of the latch 164 and extended to the data input of latch 186 of the channel comparator 60. For the condition of the first transmission of a data pulse in the third data channel, latches 186 and 188 of the comparator 60 and output latch 64 are reset, and the coincidence between the pulse output of the channel selector 58 at gate 182 and the data pulse at the output of latch 164 cause latch 186 to be set. However, the output latch 64 remains reset until detection of the data pulse in third data channel of the next successive data frame. The detection of such data pulse causes the pulse stoed in latch 186 to be transferred to latch 188. When latches 186 and 188 are set, gates 194 and 196 of the consecutive channel pulse detector 62 ae enabled causing the output latch 64 to be set. When latch 64 is set, relay coil 205 is energized closing contacts K1A to connect functional device 31 to power lines O3A and N for energizing the device 31. The receiver 21 maintains the relay K1 energized as long as the transmitter 11 continues to transmit control signals during the third data channel, and two successive third data channel pulses are not missing.

The channel selector 58 prevents the receiver 21 from responding to data pulses transmitted in data channels other than the third data channel. Accordingly, during the thirteenth or any other data channel when the data pulses for enabling transmitter 22 are transmitted, such pulses are also detected by receiver 21 in the manner described above, causing latch 164 of the time reference pulse shifter 55 to be set, providing a logic 1 level to the data input of the latch 186 of the comparator 60. However, since the gate 182 of the channel selector 58 is maintained disabled at such time, no clock pulse is provided to latch 186, and the state of latch 186 is uneffected by such data pulse.

The receiver 21 maintains the functional device 31 operated as long as the transmitter 11 continues to transmit channel pulses in the third data channel. Referring to FIG. 5, to effect deenergization of the functional device 31, switch S3 of the transmitter channel selector 44 is operated to an open position to prevent the pulse output of the step counter 42 from being extended to the mixer 45, or two successive third data channel pulses are missing.

Referring to FIG. 6, during the first data frame in which channel pulses are not transmitted in the third data channel, the lack of a logic 1 level at the output of the latch 164 at the time the gate 182 of the channel selector 58 is enabled, permits the latch 186 of the comparator 60 to be reset. During the next data frame, the lack of a channel pulse in the third data channel permits the logic 0 pulse stored in latch 186 to be transferred to latch 188, and since both latches 186 and 188 are not reset, gates 194 and 196 of the consecutive channel pulse detector 62 are enabled to effect reset of output latch 64, whereby relay K1 and thus functional device 31, are deenergized.

In the case where the receiver 21 controls more than one functional device and includes a separate count decoder 61a, such count decoder 61a responds to the presence of channel pulse in the assigned data channel in two consecutive data frames to effect the energization or deenergization of relay K2 in the manner described above for count decoder 61.

EXPANDED CHANNEL SYSTEM

In accordance with a further embodiment for a multi-channel control system provided by the present invention, the system employs a plurality of addressable receivers, such as receiver 220 shown in block diagram form in FIG. 7, which are selectively enabled by the control signals provided by the transmitter 11, shown in FIG. 2, to control associated functional devices, such as functional device 232 associated with receiver 220. The basic system concept and the transmitter arrangement are the same as described in the foregoing embodiment. Hoever, the control signals transmitted by the transmitter 11 consist of a start pulse followed by twelve data pulses in twelve data channels which provide a ten bit address code and a two bit on/off control command for enabling the addressed receiver to control the functional device associated with such receiver.

The receiver 220, which is typical of one of a plurality of such receivers employed in the expanded channel system compares a stored address with the received address, and the addressed receiver responds to the control command to control the operation of the associated functional device 232.

A typical application of the expanded channel system may be in large hotels or motels to turn off heating, cooling or illuminating equipment and devices in rooms remotely from a central desk when a room is no longer occupied. Each receiver maintains the associated functional device in the state to which it was set by a previous command until a complementary command is received. Accordingly, continuous transmission of the address and command code is not required, and the transmitted signal can be changed to effect the operation of different receivers to turn on or off equipment in different rooms as desired.

More specifically, with reference to the block diagram for the transmitter 11 shown in FIG. 2, the transmitter 11 may be connected to the power line conductors O1A and the neutral as shown in FIG. 1. The step counter 42, the start pulse coder 43 and the channel selector 44 operate under the control of clock pulses derived from the AC power signals by the clock 41 as described above to provide a start pulse followed by thirteen data pulses, which define thirteen data channels, during each data frame.

In the illustrative embodiment, the expanded channel system obtains up to 1023 separate data channels, providing a unique address for up to 1023 receivers. It is apparent that more than one receiver may have the same address if desired to permit simultaneous enabling of more than one receiver for certain applications.

In the present example, 1023 separate data channels are provided by a ten bit binary address and the on/off command is provided by a two-bit word. Accordingly, only twelve of the data channels provided by the channel selector 44 are used.

The coding of the data bits to represent the address of a given receiver and the on/off command for such receiver is accomplished by appropriate setting of the select switches S1–S12 (FIG. 5) which comprise the channel selector 44. Switches S1 and S2 provide the coding for the on/off command, and switches S3–S12 provide the coding for the ten bit address, enabling pulses to be extended to the mixer 45 in accordance with the settings of the select switches S1–S12.

The start pulse, and the data pulses including the two command pulses and the ten address pulses, are extended over the mixer 45 to control the modulator 46 which impresses 120KHz square wave pulses, representing the information to be transmitted, on to the 60 Hz power signals conducted on the power lines.

Referring to FIG. 7, which is a block diagram of the receiver 220, the receiver 220 may be connected to the power line conductors O3A and the neutral in the manner of receiver 21 as shown in FIG. 1. The receiver 220 includes a demodulator 221, which recovers the data pulses from the modulated signal conducted on the power line. The data pulses representing the on/off command and the ten-bit address are extended to a shift register 224 under the control of a clock circuit 225. A comparator circuit 228 compares the address pulses stored in the shift register 224 with a stored address for the receiver 220, and an on/off command circuit 230 responds to the two-bit on/off command to provide a command output, indicative of the command to an output latch circuit 229. The latch circuit 229 is enabled by the comparator 228 to respond to the command output whenever the received address corresponds to the address assigned to the receiver 220 and provide a suitable control output for an output drive circuit 231 which controls the energization of the functional device 232.

Considering the receiver 220 in more detail, the receiver 220 includes a power supply circuit 235 which derives a DC signal at level V2 for the receiver circuits from the 60 Hz power signals conducted on the power lines. The clock circuit 225 inclues a clock pulse generating circuit 233, which derives pulses at a 60 Hz rate from the AC signals conducted on the power lines, and a pulse divider and sync circuit 234 which divides the 60 Hz pulses to provide clock pulses at a 30 Hz rate.

The demodulator 221 is coupled over to the power line conductors O3A and N over a 120 KHz filter 222 which filters out the 60 Hz power signal and passes the 120 KHz signal to the demodulator 221. The demodulator 221 responds to the 120 KHz signals to provide logic level pulses representing the transmitted information, including the start pulse and the data signals. The logic level pulses are synchronized with the leading edge of the 30 Hz clock pulses by the pulse divider and sync circuit 234.

The start pulse is detected by a start pulse detector 227 which responds to the start pulse, which is longer in duration than the data pulses, to reset the shift register 224. The twelve data pulses, representing the two-bit on/off command and the ten-bit address, are extended to the shift register 224 over a pulse stretcher 223 and gated into the shift register 224 under the control of 30 Hz clock pulses. The pulse stretcher 223 assures proper loading of the data pulses into the shaft register 224.

Figure 8:
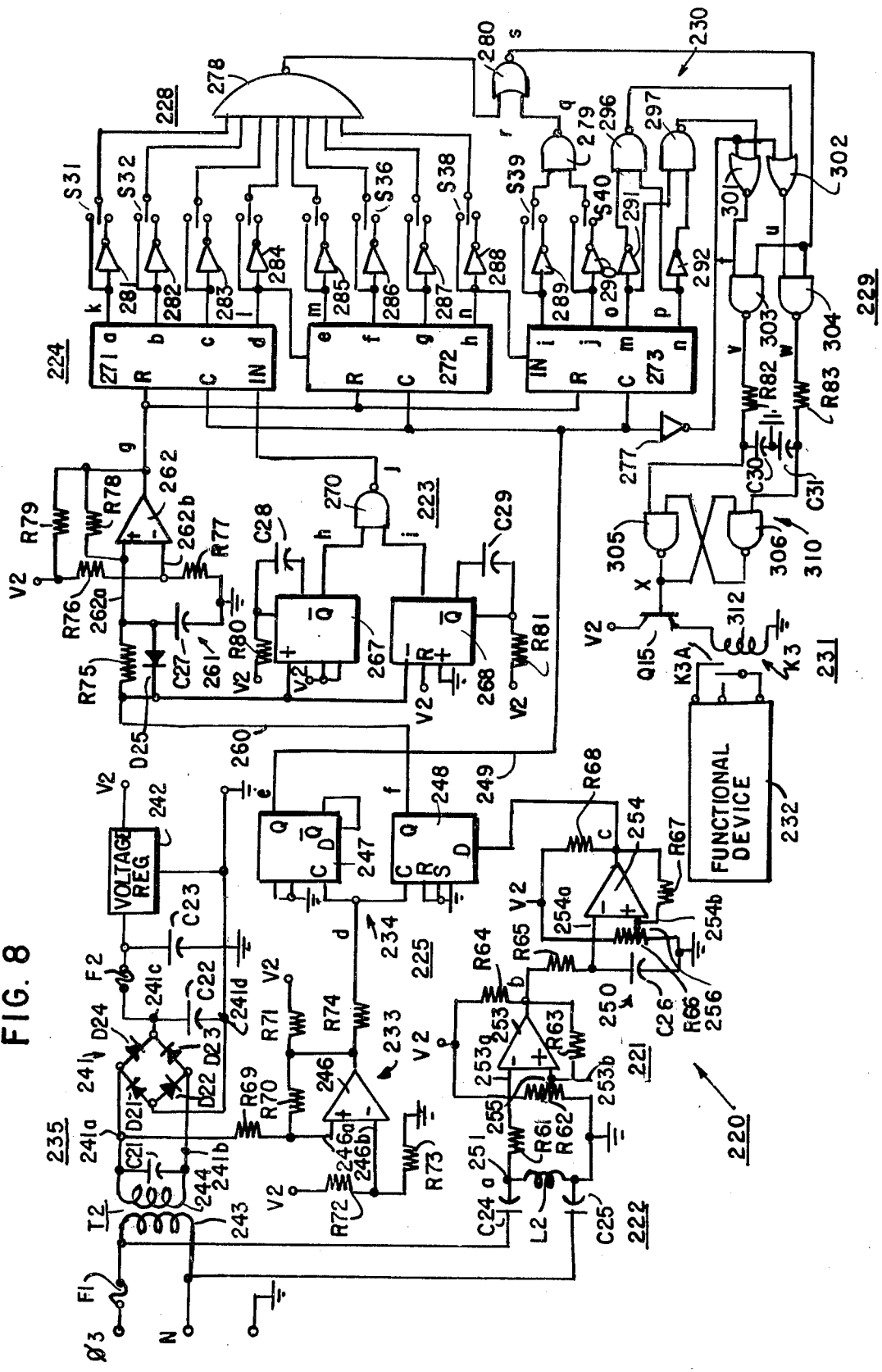
FIG. 8 is a schematic circuit diagram for the receiver unit shown in FIG. 7; and, FIG. 9 is a timing chart showing wareforms of signals for the receiver unit of FIG. 8.

The comparator 228 includes select switches S31–S40 shown in FIG. 8, which are operated to set the desired address. When the ten data pulses loaded into the shift register 224, correspond to the address set by the select switches, the comparator circuit 228 is operable to provide an enabling signal to the output latch 229. Whenever the enabling signal is provided by the comparator circuit 228, the output latch 229 responds to the output of the on/off commond circuit 230 to set the output drive 231 to the state indicated by the command signal. The output latch 229 is synchronized with the incoming data by way of 30 Hz clock pulses. The output latch 229, once set (or reset) by the proper on/off command, remains in such state until the opposite command is received by the receiver 220.

The output drive means 231 comprises a suitable switching device, such as a relay having either normally open or normally closed contacts connected to the functional device 232 for controlling the energization or deenergization of the functional device 232. Whenever the output drive relay 231 is disabled (enabled) so that the functional device 232 is deenergized (energized) and the command indicates the output drive relay 231 is to be disabled (enabled), then the output drive relay 231 remains disabled (enabled) without any interruption. If, on the other hand, the received command is opposite to that of the state of the output drive, then the output drive relay 231 changes state.

Referring to FIG. 8, there is shown a schematic circuit and partial block diagram of the receiver 220 shown in block form in FIG. 7. The powder supply circuit 235 includes a full wave bridge rectifier circuit 241, including diodes D21–D24, filter capacitors C21–C23, and a voltage regulator circuit 242, such as the National Type Lm 341P. An input transformer T2, having a primary winding 243 connected between phase conductor 03 and the neutral conductor N of the power line and a secondary winding 244, couples the AC power signals to the bridge rectifier circuit 241 at inputs 241a and 241b thereof. The output of the bridge circuit 241 at terminals 241c and 241d, is applied to the inputs of the voltage regulator circuit 242, which provides a regulated output voltage V2, at a level of 12 vdc, referenced to a ground level. Capacitor C21 is connected in parallel with the secondary winding 244, and capacitors C22 and C23 are connected across the inputs of the voltage regulator circuit 242. A fuse F1, which is connected in series with the hot line 03 and winding 243, and a fuse F2, which is connected between the output of the bridge rectifier 241 and the voltage regulator circuit 242, provide overload protection.

The clock pulse generating circuit 233 comprises a comparator circuit 246 which responds to the positive half cycles of the AC signals coupled over transformer T2 and a reference signal to provide a square wave output at a 60 Hz rate. The comparator circuit 246, which may be one stage of the Type 339 Quad comparator, commerically available from National has one input 246a connected over a resistor R69 to the secondary winding 244 at terminal 241a to receive the AC power signals, and a second input 246b connected to a voltage divider, comprised of the resistors R72 and R73, which are connected in series between V2 and ground to provide the reference signal at input 246b.

The comparator circuit 246 includes a bias network, including a resistor R71 which is connected between the output of the comparator circuit 246 and V2, and a resistor R70 which is connected between the comparator output and the input 246a, which bias the comparator circuit 246 normally off. The comparator 246 converts the AC sine wave into square wave pulses at a 60 Hz rate which are shown in FIG. 9 at line d. Resistors R72 and R73 determine the duty cycle of the clock pulse generating circuit 233.

The output of the comparator circuit 246 is connected over a resistor R74 to an input of the clock and sync circuit 234, which is comprised of a pair of flip flops 274 and 248, such as the type 4013, commercially available from RCA Corp. Flip flop 247 divides the 60 Hz pulses by two, providing clock pulses at a 30 Hz rate (FIG. 9, line e), which are extended over line 249 to the shift register 224 and to the output latch circuit 229. The data input of flip flop 248 is connected to the output of the demodulator circuit 221.

The demodulator circuit 221 comprises two comparator circuits 253 and 254, such as two stages of the Type 339 Quad comparator circuit, and a filter circuit 250, which is interposed between the two comparator stages. The comparator circuit 253 has inputs 253a and 253b coupled to the power line conductors 03A and N over capacitors C24 and C25 which, together with an inductor L2 comprise the 120 KHz pass filter 222 which pass the 120 KHz tone bursts, providing the wave form shown in FIG. 9 at line b. Input 253a of the comparator circuit 253, is connected over a resistor R61 to point 251 to which is connected one side of capacitor C24, the other side of which is connected to phase conductor 03A. Capacitor C25 is connected between the neutral line N of the power line and ground. The inductor L2 is connected between point 251 and ground.

The second input 253b of the comparator circuit 253 is connected to a wiper 255 of a variable resistor R62, which is connected between V2 and ground and provides a reference potential at input 253b. Resistor R62 serves as a sensitivity adjustment for comparator stage 253 to set the proper detection threshold for the comparator circuit 253. The comparator circuit 253 further includes a bias network including a resistor R64 shown connected between the output of the comparator 253 and V2 and a feedback resistor R63 shown connected between the comparator circuit output and input 253b.

The output of the comparator 253 is coupled to an input 254a of comparator circuit 254 over the filter network 250, which includes a resistor R65 and a capacitor C26. Resistor R65 and capacitor C26, which are connected in series between the output of comparator circuit 253 and ground, filter out the 120 KHz carrier frequency and provide an input signal to input 254a of comparator circuit 254 which has a second input 254b connected to a wiper 256 of a variable resistor R66, which is connected between V2 and ground, and provides a reference level at input 254b.

The comparator circuit 254 includes a bias network including a resistor R67 which is connected between the comparator output and input 254b, and a resistor R68, which is connected between the output of the comparator circuit. Comparator circuit 254 buffers the data pulses and extends the pulses (FIG. 9, line c) to the data input of a flip flop 248. Resistor R66 determines the threshold and polarity of the pulses.

Comparator 253 wave shapes the 120 KHz modulation signal detected by filter 222. This establishes a constant peak-to-peak, constant frequency tone burst into demodulator filter 250. Also, comparator 253 along with resistor R61 provides a high impedance to the detected 120 KHz signal at point 251 and at the same time provides a low output impedance to filter circuit 250 for proper filtering.

The flip flop 248 is driven by clock pulses at a 60 Hz rate provided by clock circuit 233 to synchronize the data pulses with the leading edge of the 30 Hz clock pulses, providing the pulse train shown in FIG. 9, line f over conductor 260.

The start pulse and the twelve data pulses provided on conductor 260 are extended to an input of the start pulse sensor 227 and to an input of the pulse stretcher circuit 223. The start pulse detector 227 includes a Type 339 comparator circuit 262 and an integrating network 261, including a resistor R75 and a capacitor C27 which changes in response to the start pulse to enable the comparator circuit 262 to provide a 40 millisecond reset pulse, FIG. 9, line g, for resetting the shift register 224.

Resistor R75 is connected between a first input 262a of comparator circuit 262 and conductor 260, and capacitor C27 is connected between input 262a and ground. A diode D25, connected in parallel with resistor R75, provided a discharge path for capacitor C27 when the signal level on conductor 260 goes low.

A reference level is provided at a second input 262b of comparator 262 by way of a voltage divider comprised of resistor R76 and R77 which are connected in series between V2 and ground. Comparator circuit 262 further includes a bias network comprised of resistors R78 and R79 which connect the output of comparator circuit 262 to input 262a and V2, respectively, which biases the comparator circuit 262 normally off. The charging time of capacitor C27 through resistor R75 provides a level at input 262a sufficient to overcome the reference level established by resistors R76 and R77, is approximately twenty milliseconds so that the comparator circuit 262 is enabled only by the start pulse. The output of the comparator circuit 262 is connected to the rest input of the shift register 224.

The pulse stretching circuit 223 comprises two timing circuits 267 and 268, each of which may be an RCA Type CD 4098 BE, monostable multivibrator. Monostable circuit 267 responds to the positive going edge of the start pulse and each logic 1 level data pulse provided on conductor 260, to provide negative goint output pulses (FIG. 9, line h) of a predetermined duration. The duration of the output pulse is determined by an associated timing network comprised of resistor R80 and capacitor C28, and in the exemplary embodiment is 19 milliseconds.

The other monostable circuit 268 responds to the negative going edge of the start pulse and the data pulses to provide negative going pulses (FIG. 9, line i) of a 19 millisecond duration as determined by its associated timing network comprised of resistor R81 and capacitor C29.

Monostable circuits 267 and 268, and gate 270 effectively stretch the start and data pulses to eliminate or minimize false clocking in the shift register stages. The pulse stretcher increases the on time of the data pulses only. This change, however, cannot be distinguished (illustrated in FIG. 9 at line h) because it is so small.

The outputs of the monostable circuits 267 and 268 are combined by a NAND gate 270, the output of which goes high whenever the output of either one of the circuits 267 and 268 goes low, providing the output pulse train shown in FIG. 9 at line j, which is extended to the input of the shift register 224, and gated into the shift register 224 under the control of 30 KHz clock pulses provides over conductor 249.

The shift register 224 is comprised of three four bit registers 271-273, such as the RCA Type 4015. The shift register stages 271-273 are connected in tandem and have clock inputs commonly connected to line 249 to receive the 30 Hz clock pulses. The shift register stages 271-273 have reset inputs commonly connected to the output of comparator circuit 262 to receive the 40 millisecond reset pulse provided by the start pulse detector 227. After the shift register stages 271-273 are reset, the two data pulses representing the on/off command are gated into the shift register 224, followed by the ten data pulses representing the address of the receiver to be enabled.

The comparator circuit 228 continuously monitors the outputs 224a–224j of the shift register stages 271–273. The comparator circuit of the addressed receiver provides an enabling output for the associated output latch whenever the ten address bits stored in the shift register 224 correspond to the address assigned to such receiver.

The comparator circuit 228 includes a pair of NAND gate 278 and 279, a NOR gate 280, and select switches S31–S40 which permit the ten outputs 224a–224j of the shift register 224 to be extended to inputs of the gates 278 and 279 either directly or over inverters 281–290. The output of gates 278 and 279 are combined by gate 280. The select switches S31–S40 are operable to provide a wired hard wired address for the receiver 220 which in the exemplary embodiment is assumed to be 791, which has a binary coding of 1100010111. The select switches S31, S32, S36, S38–S40 are set to connect outputs a, b, f, and h–j directly to inputs of gates 278 and 279, and switches S33–S35 and S37 are set to interpose inverters 283–285 and 287 between respective outputs c–e and g of the shift register 224 and inputs of gate 278. Accordingly, when the bits stored in shift register 224 represent the binary coding for the address 791, all of the inputs to gates 278 and 279 are at logic 1 levels enabling the gates 278 and 279 to enable gate 280.

The output of gate 280 is connected to inputs of a pair of NAND gates 303 and 304 of the latch circuit 229 which has second inputs provided over a pair of NOR gates 301 and 302 which receive inputs from outputs of the on/off command circuit 230 and are strobed by 30 Hz clock pulses provided over inverter 277 from conductor 249. The enabling of one or the other of the gates 303 or 304 is controlled in accordance with the state of the on/off command bits.

The on/off command circuit 230 includes two NAND gates 296 and 297 the states of which are controlled by the output levels at outputs m and n of the shift register 224, which represent the command bits. Output 224m is connected over an inverter 291 to one input of gate 296 which has a second input connected directly to output 224n. Output 224n is also connected over an inverter 292 to an input of gate 297 which has a second input connected directly to output 224m.

Whenever a "turn on" command is received, outputs 224m and 224n are logic 1 and logic 0 levels, respectively, and the output of gate 296 goes high inhibiting gate 302 and the output of gate 297 goes low enabling gate 301 to following the inverted clock pulses extended over inverter 277. Conversely, whenever a "turn off" command is received, outputs 224m and 224n are at logic 0 and logic 1 levels, respectively, and gate 296 enables gate 302 to follow the clock pulses while gate 297 inhibits gate 301.

Gates 301 and 302 in turn control the setting or the resetting of an output latch 310 over gates 303 and 304, which receive the enabling output of the comparator circuit 228 whenever the received address corresponds to the address set by the select switches S31–S40. The outputs of gates 303 and 304 are extended over resistors R82 and R83 respectively to set and reset inputs of the latch 310, which is comprised of two NAND gates 305 and 306. Capacitors C30 and C31 differentiate the pulses to provide a trigger pulse for the latch 310. When gate 303 is enabled, the latch 310 is set, and when gate 304 is enabled, the latch 310 is reset.

The latch 310 controls the state of output relay K3 over a drive transistor Q15, which is operable when enabled to energize the operate coil 312 of relay K3 to operate its contacts. Once set, the latch 310 remains set until a reset command is received and detected by the receiver 220.

OPERATION OF THE EXPANDED CHANNEL SYSTEM

By way of example, it is assumed that the functional device 232 controlled by receiver 220 is initially deenergized. Referring to FIG. 5, to effect enabling of receiver 220, the transmitter 11 transmits a start pulse and twelve data pulses including a ten bit binary address representing the binary coding for the address assigned to receiver 220, and a two bit on/off command. The information is transmitted during successive data frames which are defined by sixteen successive cycles of the AC power signals. To provide the "turn on" command, select switch S1 is set to an open position and select switch S2 is closed. The address 791 for receiver 220 is set by closing switches S1–S3, S5 and S9–S10, and opening switches S4, S6–S8.

As the counter 91 is cycled by clock pulses provided by the clock 41, the outputs of the counter 91 are decoded by the code translator 96 providing inputs to decoding gates 135–137, representing the coding for the twelve data pulses as set by select switches S1–S12, providing control signals over gates 138–139 to the modulator 46. In addition, the start pulse generator 43 controls gates 138–139 to provide a start pulse.

The start pulse, which is 66.666 milliseconds long, and the twelve data pulses, each 16,666 milliseconds in duration, as extended to the modulator 46 enable the 120 KHz carrier signal provided by oscillator 47 to be coupled to the power line over output buffer stage 48 and capacitors C9 and C10 to be impressed on the 60 Hz power signals conducted thereon.

Referring to FIG. 8, comparator circuit 246 of the clock pulse generating circuit 233 responds to the AC power signals coupled to input 246a thereof over transformer T2 and resistor R69 to provide clock pulses at a 60 Hz rate as shown in FIG. 9 at line d. The comparator circuit 246, which is normally disabled, is enabled during each positive half cycle of the AC wave form when the amplitide of the AC power signal exceeds the reference level provided at input 246b by resistors R75 and R73.

The 60 Hz pulses are extended to the clock input of flip flop 247 of the clock divider circuit 234 which responds to the 60 Hz pulses to provide a pulse for each alternate pulse thereby providing output pulses at a 30 Hz rate over line 249 as shown in line e of FIG. 9.

The modulated AC signals are also extended to the demodulator 221 over the 120 KHz filter circuit 222 which passes the 120 KHz carrier frequency providing 120 KHz tone bursts for each logic 1 level of the information transmitted by transmitter 11. The tone bursts, shown in line a of FIG. 9, are extended to input 253a of comparator circuit 253 which responds to the 120 KHz tone bursts to provide the output shown in line b of FIG. 9. The signal output of comparator circuit 253 is extended to input 254a of comparator circuit 254 over the filter comprised of capacitor C26 and resistor R65, which filters out the 120 KHz carrier frequency and enables comparator circuit 254 to provide a logic 1 level corresponding to the duration of each tone burst, as shown in line c of FIG. 9. Accordingly, the output of comparator circuit 254 corresponds to the start pulse and the data pulses transmitted by the transmitter 11.

The output of comparator circuit 254 is extended to the data input of flip flop 248 which is driven by the 60 Hz pulses for synchronizing the incoming leading edge of the 60 Hz pulses and thus to the 30 Hz clock pulses. The resultant data output pulse train provided over conductor 260, as shown in line f of FIG. 9, is thus synchronized to the leading edge of the 30 Hz clock pulses.

As shown in line f of FIG. 9, the start pulse (which is generated at end of the preceeding data frame) is followed by the logic 0 and logic 1 level bits which represent the "turn on" command, and the ten bits 1110100011 which represent the binary coding for the address 791 for receiver 220. The data pulse train, including the start pulse and the twelve data pulses are extended over conductor 260 to the start pulse detector 227 and to the pulse stretcher circuit 223.

The timing circuit, comprised of resistor R75 and capacitor C27, integrates the start pulse, and after approximately 20 milliseconds, which is greater than the duration of the data pulses, provides a signal level at input 262a of the comparator circuit 262 which exceeds the reference level provided at input 262b by resistors R76 and R77, enabling the comparator circuit 262 which provides the 40 millisecond reset pulse (FIG. 9, line g) for resetting stages 271-273 of the shift register 224.

At the end of the start pulse, the one shot circuits 267 and 268 respond to the leading and trailing edges, respectively, of each data pulse causing their outputs, which are normally high to go low providing output pulses (FIG. 9, lines h and i). Whenever the start of one of the one-shot circuits 267 or 268 is low, the output of gate 270 is high providing a logic 1 level data pulse at the input of the shift register 224 as shown in line j of FIG. 9. The data pulses are gated into the first stage 271 of the shift register 224 and shifted from stage to stage under the control of 30 Hz clock pulses provided over line 249 from the output of the clock divider circuit 234, providing output levels as shown in FIG. 9 at lines k-n, for example, which correspond to the signal levels at outputs a, d, e and h, respectively, of shift register 224. After twelve clock pulses have been provided, the stages of the shift register store the twelve bits representing the ten bit address and the two bit on/off command. At such time, the signal levels on outputs 224a-224j of the first ten stages of the shift register 224 enable gates 278 and 279, FIG. 9, lines q and r, thereby enabling gate 280 which provides an enabling input (FIG. 9, line s) to gates 303 and 304 of the output latch circuit 229. Moreover, the logic 1 level provided at output 224m of the stage 273 of the shift register 224, (FIG. 9, line o) causes the output of gate 296 to go high and the output of gate 297 to go low such that gate 302 is inhibited and gate 301 is enabled to follow the inverted clock pulses provided over inverter 277 (FIG. 9, lines t and u). Accordingly, gate 303 is enabled providing a negative going pulse (line v of FIG. 9) for setting the latch 310, while gate 304 remains disabled (FIG. 9, line w). When the latch 310 is set, the output goes high as shown in FIG. 9, line x, enabling transistor Q15 which energizes the operate winding 312 of relay K3, which then operates to close contacts K3A to energize the functional device 232. The latch 310 remains set until a subsequent "turn off" command is provided to effect reset of the latch 310.

Once the output latch 310 has been set and the functional device 232 is energized, then subsequent transmissions by the transmitter 11 of the same data word are ineffective to change the output state of the latch 310. Additionally, when the transmitter 11 is reprogrammed to transmit a different address and the same or a different command, such data word as received by the receiver 220 does not effect a change of the state of latch 310.

To deenergize the functional device 232, the state of latch 310 is complemented by programming switches S1 and S2 of the transmitter 11 to represent a "turn off" command, that is, switch S1 closed and switch S2 open, and programming switches S2-S12 of the transmitter 11 to the address for receiver 220 as noted above. When such information is transmitted and received by receiver 220 and gated into the shaft register 224, gates 278 and 279 of the comparator circuit 228 are enabled in the manner described above. However, a logic 0 level is now provided at output 224m of the shift register 224 and a logic 1 level is provided at output 224n such that the output of gate 296 is low and the output of gate 297 is high. Accordingly, gate 301 is now inhibited and gate 302 is now enabled to extend clock pulses to enable gate 304 to thereby provide a negative going pulse over resistor R83 to the reset input of the latch 310, causing the latch 310 to be reset. When latch 310 is reset, transistor Q15 is cut off, deenergizing operate coil 312 of relay K3 which then releases, permitting contacts K3a to open to deenergize the functional device 232.

We claim:

1. In a control system wherein functional devices are controlled in response to control signals transmitted over an electrical power distribution network of a building complex including power lines which conduct cyclical AC power signals, a control arrangement comprising transmitter means including timing means coupled to one of said power lines and responsive to a plurality of cycles of said power signals to define a like plurality of data channels which comprise a data frame, and signal means responsive to said timing means for providing control signals at a predetermined frequency which are coupled to said power line during selected ones of a plurality of said data channels for transmission over said power distribution network, and a plurality of receiver means each individually associated with a different one of said functional devices, each of said receiver means including input means coupled to one of said power lines for detecting said control signals, and enabling means for enabling the associated receiver means to respond to control signals in at least one of said data channels for controlling the associated functional device.

2. A control system as set forth in claim 1 wherein said signal means includes select means for determining the data channels in which control signals are coupled to said power line.

3. A control system as set forth in claim 2 wherein said select means includes programmable switch means manually operable to select the data channels.

4. A control system as set forth in claim 2 wherein said timing means includes first means responsive to said plurality of cycles of said power signals to provide a plurality of output pulses of a predetermined time duration which determine the time for which control signals are coupled to said power line in the selected data channels.

5. A control system as set forth in claim 4 wherein said timing means is responsive to further cycles of said AC power signals to provide further output pulses of said predetermined duration, said signal means including second means responsive to further output pulses to cause control signals to be coupled to said power line for a predetermined time duration for providing a start signal which indicates the start of said data frame.

6. A control system as set forth in claim 1 wherein said signal means includes signal generating means which provides control signals at a frequency which is a harmonic of the frequency of the AC power signals.

7. A control system as set forth in claim 5 wherein said enabling means for each receiver means includes further select means for selecting one of data channels for said receiver means to enable said receiver means to respond to control signals transmitted in said selected data channel.

8. A control system as set forth in claim 7 wherein said further select means includes programmable switch means manually operable to select the data channel for said receiver means.

9. A control system as set forth in claim 7 wherein said further select means is responsive to said AC power signals and to said start signal to provide an enabling signal at a predetermined time following said start signal, and wherein said enabling means further includes comparator means responsive to said input means and said enabling signal for effecting the enabling of said functional device whenever control signals are transmitted in a preselected one of said data channels.

10. A control system as set forth in claim 9 wherein said comparator means includes means for delaying the enabling of said functional device until after control signals have been transmitted in the preselected data channel in a plurality of consecutive data frames, and for thereafter maintaining said functional device enabled until control signals fail to be transmitted in said preselected data channel in said plurality of consecutive data frames.

11. A control system as set forth in claim 10 wherein said further select means includes missing signal detecting means enabled whenever the start signal fails to be transmitted in a data frame to inhibit said further select means.

12. A control system as set forth in claim 9 wherein said enabling means includes further comparator means responsive to said input means and to a further enabling signal provided by said further select means for effecting the enabling of a further functional device.

13. A control system as set forth in claim 4 wherein the control signals transmitted in first ones of said data channels represent an address for a selected receiver means, and the control signals transmitted in at least a second one of said data channels represents a control command indicating a control function to be provided, the enabling means of each receiver means including addressable means operable to provide a control output whenever the control signals in said first data channels represent an address assigned to the receiver means, and control means responsive to said control output to effect the control functions indicated by the control signals in said second data channel.

14. A control system as set forth in claim 13 wherein said addressable means includes programmable switch means selectively operable to select an address for the associated receiver means.

15. A control system as set forth in claim 13 wherein said control means includes bistable means which is set to a first state to effect the energization of the associated functional device in response to a first control command, and is set to a second state to effect the deenergization of the associated functional device in response to a second control command.

16. A control system as set forth in claim 13 wherein said transmitter means includes start pulse generating means responsive to said timing to effect the generation of a start pulse at the start of each data frame for transmission over said power distribution network, each of said receiver means including start pulse detecting means responsive to said start pulse to enable said addressable means to respond to said control signals.

17. In a control system wherein functional devices are controlled in response to control signals transmitted over an electrical power distribution network of a building complex including power lines which conduct cyclical AC power signals, a control arrangement comprising transmitter means including first timing means coupled to one of said power lines and responsive to said power signals to continuously define a plurality of data channels which comprise data frames, data means responsive to said first timing means for generating a start signal at the start of each data frame followed by data signals in at least one of said data channels of said data frame and signal means for applying said start signal and said data signals to said power line for transmission over said power distribution network, and at least one receiver means associated with one of said functional devices and including input means coupled to one of said power lines for detecting said start signal and said data signals in each data frame, second timing means responsive to said AC power signals for generating a sequence of output signals, referenced in time to said AC power signals, enabling means controlled by said input means to respond to said output signals to provide an enabling output at a predetermined time following the detection of said start signal, and output means enabled by said enabling output to be responsive to said input means for controlling the associated functional device whenever a data signal is detected at said predetermined time in a plurality of successive data frames.

18. A control system as set forth in claim 17 wherein said timing means includes means responsive to said AC power signals to provide a plurality of output pulses of a predetermined duration and at a predetermined rate for each of said data frames, said data means including start signal generating means responsive to at least one of said output pulses to effect the generation of said start signal, and select means responsive to further ones of said output pulses which define said data channels to effect the generation of data signals of said predetermined duration in at least said one data channel.

19. A control system as set forth in claim 18 wherein said input means includes reference means responsive to said output signals and said data signals to provide an output of said predetermined duration which is referenced in time to said AC power signals.

20. A control system as set forth in claim 17 wherein said input means includes detect means responsive to said start signal to provide a first output and responsive to each data signal to provide a second output, said enabling means including pulse counting means responsive to the output signals provided by said second timing means to provide output pulses, and wherein said input means includes means responsive to said first output to reset said pulse counting means whereby said pulse counting means provides pulse outputs which correspond in time to the data channels, said enabling means including select means responsive to a preselected one of said pulse outputs to provide said enabling output.

21. A control system as set forth in claim 20 wherein said output means includes pulse storage means responsive to said enabling output to be controlled by a second output of said detect means to provide a control output for controlling the functional device.

22. A control system as set forth in claim 21 wherein said pulse storage means includes first data latch means which is set in response to the coincidence of said enabling output and one of second outputs of said detect means in a first data frame, and second data latch means which is set in response to the coincidence of said enabling output and one of said second outputs of said detect means in the next consecutive data frame.

23. A control system as set forth in claim 22 wherein said output means further includes output control means operable when enabled to effect energization of said functional device and means responsive to the setting of said first and second data latch means to enable said output control means.

24. A control system as set forth in claim 23 wherein said first and second data latch means are reset in response to the lack of coincidence of said enabling output and one of said second outputs of said detect means in two consecutive data frames to effect the disabling of said output control means for causing said functional device to be deenergized.

25. A control system as set forth in claim 23 wherein said enabling means includes missing signal detecting means enabled whenever a start fails to be transmitted in a data frame to effect reset of said first and second data latch means.

26. In a control system wherein functional devices are controlled in response to control signals transmitted over an electrical power distribution network of a building complex including power lines which conduct cyclical AC power signals, a control arrangement comprising transmitter means including first timing means coupled to one of said power lines and responsive to a plurality of cycles of said power signals to define a like plurality of data channels which comprise a data frame, signal generating means for providing control signals at a predetermined frequency at an output thereof, switching means responsive to said first timing means for coupling said output of said signal generating means to said power line to permit the transmission of said control signals over said power distribution network in selected data channels, and select means interposed between said first timing means and said switching means for selecting the data channels, and at least one receiver means associated with one of said functional devices and including second timing means responsive to said AC power signals for providing a first control output at a time following the start of said data frame which corresponds to a data channel assigned to said receiver means, input means coupled to one of said power lines for detecting control signals transmitted over said power distribution network during said data frame and providing a second control output whenever control signals are detected, and comparator means responsive to the coincidence of said first control output and one of said second control outputs for controlling the associated functional device.

27. A control system as set forth in claim 26 wherein said first timing means includes means responsive to said AC power signals to provide a plurality of output pulses of a predetermined duration each of which defines a different one of said channels, said switching means being controlled by said select means to couple the output of said signal generating means to said power line for said predetermined duration to permit transmission of said control signals for such duration.

28. A control system as set forth in claim 27 wherein said input means includes pulse shaping means and detecting means including frequency detecting means and level detecting means interposed between said power line and said pulse shaping means for enabling said pulse shaping means to provide an output pulse of a duration which corresponds to the time that control signals are transmitted over said power line by said transmitter means in a given data frame.

29. A control system as set forth in claim 28 wherein said input means includes reference means responsive to each output pulse of said pulse shaping means and to further outputs of said second timing means to provide an output pulse of said predetermined duration which is referenced to said AC power signals.

30. In a control system wherein functional devices are controlled in response to control signals transmitted over an electrical power distribution network of a building complex including power lines which conduct cyclical AC power signals, a control arrangement comprising transmitter means including clock pulse generating means coupled to one of said power lines and responsive to said power signals to provide clock pulses at a predetermined rate, pulse counter means responsive to said clock pulses to provide a timed sequence of output pulses which define a data frame, signal generating means for providing a control signal at a predetermined frequency at an output thereof, switching means operable when enabled to couple the output of said signal generating means to said power line, and select means operable to extend selected ones of said output pulses to said switches means for enabling said switching means, and receiver means associated with one of said functional devices and including clock pulse generating means coupled to one of said power lines and responsive to said power signals to provide clock pulses, enabling means responsive to said clock pulses to provide a first control output at a time following the start of said data frame, input means coupled to said power line for detecting the control signals conducted over said power line for providing a second control output in response to each control signal detected, and comparator means responsive to the coincidence of said first control output and one of said second control outputs for controlling the associated functional device.

31. A control system as set forth in claim 30 wherein said select means includes programmable switch means including a plurality of switch devices interposed between a plurality of outputs of said counter means and a plurality of inputs of said switching means, said switch devices being individually operable to permit selected ones of said output pulses to be extended to said switching means.

32. A control system as set forth in claim 30 wherein said enabling means includes further pulse counting means responsive to said clock pulses to provide a sequence of output pulses representing the number of clock pulses counted, and further select means including output means enabled by output pulses provided when a preselected number of clock pulses have been counted to provide said control output.

33. A control system as set forth in claim 32 wherein said further select means includes a plurality of switch devices individually operable to select the number of clock pulses to be counted for enabling said output means.

34. In a control system wherein functional devices are controlled in response to control signals transmitted over an electrical power distribution network of a building complex including power lines which conduct cyclical AC power signals, a control arrangement comprising a plurality of addressable receiver means each individually associated with a different one of said functional devices, and transmitter means for selectively enabling said receiver means, said transmitter means including first timing means coupled to said power lines and responsive to said power signals to continuously define a plurality of data channels which comprise data frames, data means responsive to said first timing means for generating a start signal at the start of each data frame followed by data signals in a plurality of said data channels of said data frame, first ones of said data signals representing an address for a selected receiver means and second ones of said data signals representing a control command indicating a control function to be provided, and switching means for applying said start signal and said data signals to said power lines for transmission over said power distribution network, each of said receiver means including input means coupled to one of said power lines for detecting said start signal and said data signals in each data frame, second timing means responsive to said AC power signals for generating timing pulses referenced in time to said AC signals, addressable means controlled by said input means and said timing pulses to respond to said first data signals to provide a control output whenever the data signals correspond to an address assigned to said receiver means, and control means enabled by said control output to be responsive to said second data signals to effect the control function indicated by said second data signals.

35. A control system as set forth in claim 34 wherein said input means includes a signal detecting means responsive to said data signals to provide data pulses at first and second levels in a sequence coded to represent said address and said control command, said addressable means including pulse storage means for storing said data pulses, and comparator means connected to first outputs of said pulse storage means to be responsive to the stored data pulses which represent the address to provide said control output whenever the received address corresponds to the address assigned to said receiver means.

36. A control system as set forth in claim 35 wherein said comparator means includes gating means operable when enabled to provide said control output and switch means interposed between said first outputs of said pulse storage means and inputs of said gating means, said switch means being programmable to connect certain ones of said first outputs directly to inputs of said gating means and to connect certain other ones of said first outputs to further inputs of said gating means over inverter means to enable said gating means to be enabled whenever the stored data pulses represent the address for said receiver means.

37. A control system as set forth in claim 35 wherein said pulse storage means comprises a multistage shift register means, data pulses being gated into said shift register means under the control of said timing pulses, and wherein said input means includes start pulse detecting means responsive to said start singal for providing a reset pulse for resetting said shift register means at the start of each data frame.

38. A control system as set forth in claim 37 wherein said input means includes pulse stretching means interposed between said signal detecting means and said shift register means and responsive to each data pulse at said first level to provide a pulse of a predetermined duration to assure proper loading of said data pulses into said shift register means.

39. A control system as set forth in claim 38 wherein said pulse stretching means includes first detecting means responsive to the positive going edge of each data pulse at said first level to provide an output pulse of a predetermined duration and second detecting means responsive to the negative going edge of each data pulse at said first level to provide an output pulse of said predetermined duration, and means for combining the pulse outputs of said first and second detecting means to provide an output pulse train representing the data pulses provided by said signal detecting means.

40. A control system as set forth in claim 35 wherein said control means includes data latch means, and command detect means connected to second outputs of said pulse storage means to receive further data pulses representing said control command, said command detect means being responsive to said control output and to said further data pulses to enable said data latch means to be set to a first state whenever said data pulses represent a first control command and to enable said data latch means to be set to a second state whenever said further data pulses represent a second control command.

* * * * *

UNITED STATES PATENT OFFICE
CERTIFICATE OF CORRECTION

Patent No. 4,060,735   Dated November 29, 1977

Inventor(s) Gregory A. Pascucci, Ramesh Krishnaiyer, and Donald Floyd Pridemore

It is certified that error appears in the above-identified patent and that said Letters Patent are hereby corrected as shown below:

Column 28, line 56, after "output" insert --pulse--;

Column 29, line 32, after "start" insert --signal--;

Column 30, line 39, "switches" should be --switching--;

Column 32, line 20, "singal" should be -- signal --.

Signed and Sealed this

Sixth Day of June 1978

[SEAL]

Attest:

RUTH C. MASON
Attesting Officer

DONALD W. BANNER
Commissioner of Patents and Trademarks